(12) United States Patent
Imahashi et al.

(10) Patent No.: US 9,764,962 B2
(45) Date of Patent: Sep. 19, 2017

(54) LI—NI COMPOSITE OXIDE PARTICLES AND PROCESS FOR PRODUCING THE SAME, AND NON-AQUEOUS ELECTROLYTE SECONDARY BATTERY

(75) Inventors: Taiki Imahashi, Kitakyushu (JP); Hiroyasu Watanabe, Kitakyushu (JP); Kazuhiko Kikuya, Kitakyushu (JP); Hideaki Sadamura, Sanyo Onoda (JP)

(73) Assignee: TODA KOGYO CORPORATION, Hiroshima (JP)

( * ) Notice: Subject to any disclaimer, the term of this patent is extended or adjusted under 35 U.S.C. 154(b) by 387 days.

(21) Appl. No.: 14/111,590

(22) PCT Filed: Apr. 12, 2012

(86) PCT No.: PCT/JP2012/060058
§ 371 (c)(1),
(2), (4) Date: Nov. 20, 2013

(87) PCT Pub. No.: WO2012/141258
PCT Pub. Date: Oct. 18, 2012

(65) Prior Publication Data
US 2014/0087262 A1    Mar. 27, 2014

(30) Foreign Application Priority Data
Apr. 14, 2011  (JP) ................................ 2011-089788

(51) Int. Cl.
*H01M 4/525* (2010.01)
*C01D 15/02* (2006.01)
(Continued)

(52) U.S. Cl.
CPC ............. *C01D 15/02* (2013.01); *C01G 53/42* (2013.01); *C01G 53/50* (2013.01); *H01M 4/505* (2013.01);
(Continued)

(58) Field of Classification Search
CPC .............................. H01M 4/525; H01M 4/505
(Continued)

(56) References Cited

U.S. PATENT DOCUMENTS

2005/0227147 A1  10/2005  Kogetsu et al.
2008/0248391 A1*  10/2008  Wakasugi .............. B82Y 30/00
                                                                429/223
(Continued)

FOREIGN PATENT DOCUMENTS

JP  2003-331841  11/2003
JP  2004-253169  9/2004
(Continued)

OTHER PUBLICATIONS

International Search Report for PCT/JP2012/60058, mailed May 22, 2012.
(Continued)

*Primary Examiner* — Emily Le
*Assistant Examiner* — Brent Thomas
(74) *Attorney, Agent, or Firm* — Nixon & Vanderhye P.C.

(57) ABSTRACT

The present invention provides lithium composite compound particles having good high-temperature storage property and excellent cycle characteristics as an active substance for a non-aqueous electrolyte secondary battery, and a secondary battery using the lithium composite compound particles. The Li—Ni composite oxide particles for a non-aqueous electrolyte secondary battery according to the present invention have a BET specific surface area of 0.05 to 0.8 m$^2$/g; an atomic ratio (Ma/Ni) of a concentration of an amphoteric metal to a concentration of Ni on an outermost surface of the respective Li—Ni composite oxide particles is 2 to 6; and the concentration of the amphoteric metal on the outermost surface of the respective Li—Ni composite oxide particles is higher than a concentration of the amphoteric
(Continued)

metal at a position spaced by 50 nm from the outermost surface toward a center of the respective Li—Ni composite oxide particles.

8 Claims, 4 Drawing Sheets

(51) Int. Cl.
 *H01M 4/505* (2010.01)
 *C01G 53/00* (2006.01)
(52) U.S. Cl.
 CPC ......... *H01M 4/525* (2013.01); *C01P 2002/52* (2013.01); *C01P 2004/04* (2013.01); *C01P 2004/61* (2013.01); *C01P 2006/12* (2013.01); *C01P 2006/80* (2013.01)
(58) Field of Classification Search
 USPC ........................................................ 429/223
 See application file for complete search history.

(56) References Cited

U.S. PATENT DOCUMENTS

| | | | |
|---|---|---|---|
| 2009/0272940 A1 | 11/2009 | Kikuya et al. | |
| 2010/0207059 A1 | 8/2010 | Uegami et al. | |
| 2010/0209771 A1 | 8/2010 | Shizuka et al. | |
| 2010/0233543 A1* | 9/2010 | Numata | H01M 4/131 429/224 |
| 2010/0310938 A1 | 12/2010 | Okada et al. | |
| 2011/0281168 A1* | 11/2011 | Watanabe | H01M 4/525 429/223 |

FOREIGN PATENT DOCUMENTS

| | | |
|---|---|---|
| JP | 2005-310744 | 11/2005 |
| JP | 2005-322616 | 11/2005 |
| JP | 2007-91573 | 4/2007 |
| JP | 2008-166269 | 7/2008 |
| JP | 2008-251390 | 10/2008 |
| JP | 2009-81130 | 4/2009 |
| JP | 2009-99461 | 5/2009 |
| JP | 2009-230863 | 10/2009 |
| JP | 2009-259798 | 11/2009 |
| JP | 2010-44963 | 2/2010 |
| JP | 2010-155775 | 7/2010 |
| JP | 2010155775 A * | 7/2010 |
| WO | WO 2007/142275 | 12/2007 |

OTHER PUBLICATIONS

Extended European Search Report in EP 12 77 0752 dated Sep. 1, 2014.
International Preliminary Examination Report (English version) in PCT/JP2012/060058 dated Oct. 24, 2013.

\* cited by examiner

LI—NI COMPOSITE OXIDE PARTICLES AND PROCESS FOR PRODUCING THE SAME, AND NON-AQUEOUS ELECTROLYTE SECONDARY BATTERY

This application is the U.S. national phase of International Application No. PCT/JP2012/60058 filed 12 Apr. 2012 which designated the U.S. and claims priority to JP Patent Application No. 2011-089788 filed 14 Apr. 2011, the entire contents of each of which are hereby incorporated by reference.

TECHNICAL FIELD

The present invention relates to Li—Ni composite oxide particles capable of reducing an amount of gases generated therefrom and exhibiting good cycle characteristics when used as a positive electrode active substance for non-aqueous electrolyte secondary batteries.

BACKGROUND ART

With the recent rapid development of portable and cordless electronic devices such as audio-visual (AV) devices and personal computers, there is an increasing demand for secondary batteries having a small size, a light weight and a high energy density as a power source for driving these electronic devices. Also, in consideration of global environments, electric cars and hybrid cars have been recently developed and put into practice, so that there is an increasing demand for lithium ion secondary batteries for large size applications having an excellent storage property. Under these circumstances, lithium ion secondary batteries having advantages such as large charge/discharge capacities and a good storage property have been noticed.

Hitherto, as positive electrode (cathode) active substances useful for high energy-type lithium ion secondary batteries exhibiting a 4 V-grade voltage, there are generally known $LiMn_2O_4$ having a spinel structure, $LiMnO_2$ having a zigzag layer structure, $LiCoO_2$ and $LiNiO_2$ having a layer rock-salt structure, or the like. Among the secondary batteries using these active substances, lithium ion secondary batteries using $LiNiO_2$ have been noticed because of large charge/discharge capacities thereof. However, the materials tend to be deteriorated in thermal stability and charge/discharge cycle durability upon charging, and it has been therefore required to further improve properties thereof.

Specifically, when lithium ions are released from $LiNiO_2$, the crystal structure of $LiNiO_2$ suffers from Jahn-Teller distortion since $Ni^{3+}$ is converted into $Ni^{4+}$. When the amount of Li released reaches 0.45, the crystal structure of such a lithium-released region of $LiNiO_2$ is transformed from hexagonal system into monoclinic system, and a further release of lithium therefrom causes transformation of the crystal structure from monoclinic system into hexagonal system. Therefore, when the charge/discharge reaction is repeated, the crystal structure of $LiNiO_2$ tends to become unstable, so that the resulting secondary battery tends to suffer from poor cycle characteristics or occurrence of undesired reaction between $LiNiO_2$ and an electrolyte solution owing to release of oxygen therefrom, resulting in deterioration in thermal stability and storage property of the resulting battery. To solve these problems, there have been made studies on materials formed by adding Co and Al to a part of Ni of $LiNiO_2$. However, these materials have still failed to solve the above-described problems. Therefore, it has still been required to provide a Li—Ni composite oxide having a more stabilized crystal structure.

One of factors causing deterioration of characteristics of the positive electrode active substances resides in that surplus lithium is likely to be present on the surface of the particles upon synthesis thereof. A large amount of the surplus lithium present on the surface of the particles tends to cause undesirable gelation of an electrode material when forming an electrode therefrom. In addition, if the surplus lithium is subjected to carbonation, generation of a carbon dioxide gas tends to be undesirably caused owing to reactions within the cell when stored in high-temperature conditions. In order to obtain the Li—Ni composite oxide comprising a less amount of the surplus lithium components, it is necessary that the surplus lithium is removed by subjecting the Li—Ni composite oxide to water-washing treatment. However, since the pH value of the washing solution tends to be increased upon the water-washing treatment, if any amphoteric metal such as Al is present in the form of a solid solution in the Li—Ni composite oxide, the amphoteric metal tends to be eluted out therefrom. On the other hand, when the content of the amphoteric metal in the Li—Ni composite oxide is excessively small, the resulting electrode material tends to be deteriorated in battery characteristics such as cycle characteristics.

More specifically, it has been required to provide Li—Ni composite oxide as a positive electrode active substance for a non-aqueous electrolyte secondary battery which is capable of comprising a less amount of surplus lithium and exhibiting good cycle characteristics.

Hitherto, in order to improve secondary battery characteristics, there are known various techniques for improving cycle characteristics, a storage property and a thermal stability thereof (Patent Documents 1 to 13).

CITATION LIST

Patent Literature

Patent Document 1: Japanese Patent Application Laid-open (KOKAI) No. 9-231963

Patent Document 2: Japanese Patent Application Laid-open (KOKAI) No. 10-162830

Patent Document 3: Japanese Patent Application Laid-open (KOKAI) No. 2005-310744

Patent Document 4: Japanese Patent Application Laid-open (KOKAI) No. 2005-322616

Patent Document 5: Japanese Patent Application Laid-open (KOKAI) No. 2005-340056

Patent Document 6: Japanese Patent Application Laid-open (KOKAI) No. 2006-36545

Patent Document 7: PCT Pamphlet WO 2006/123572

Patent Document 8: Japanese Patent Application Laid-open (KOKAI) No. 2007-273106

Patent Document 9: Japanese Patent Application Laid-open (KOKAI) No. 2008-123815

Patent Document 10: Japanese Patent Application Laid-open (KOKAI) No. 2008-166269

Patent Document 11: Japanese Patent Application Laid-open (KOKAI) No. 2008-251532

Patent Document 12: Japanese Patent Application Laid-open (KOKAI) No. 2009-137834

Patent Document 13: Japanese Patent Application Laid-open (KOKAI) No. 2009-230863

SUMMARY OF THE INVENTION

Problem to be Solved by the Invention

At present, it has been strongly required to provide the Li—Ni composite oxide as a positive electrode active substance for a non-aqueous electrolyte secondary battery which is capable of satisfying various characteristics described above. However, the Li—Ni composite oxide capable of fully satisfying these requirements has not been obtained until now.

That is, in Patent Documents 1, 2 and 8, it is described that Li—Ni composite oxide is washed with water or an organic solvent to remove impurities including surplus lithium therefrom, so that it is possible to improve cycle characteristics or a storage property thereof. However, in these Patent Documents, there are no descriptions concerning an amount of an amphoteric metal present therein and a gradient of a concentration thereof. Therefore, it is not considered that the cycle characteristics of the Li—Ni composite oxide can be improved only by these techniques to a sufficient extent.

Also, in Patent Documents 3, 4, 5, 6 and 7, it is described that at least one element selected from various metal elements is attached to a surface of a positive electrode active substance or the amount of the metal element used for treating the surface of the positive electrode active substance is increased to form a coating layer thereon, thereby improving cycle characteristics, a high output and reduction in internal characteristics. However, since the coating layer is formed of a material different from the positive electrode active substance, the techniques described in these Patent Documents are different from the present invention in which while maintaining a suitable content of the amphoteric metal in Li—Ni composite oxide by controlling a pH value of a slurry during the water-washing treatment, a gradient of a concentration of the amphoteric metal in the respective Li—Ni composite oxide particles is allowed to be present, whereby a coating layer having a high amphoteric metal concentration is formed on a surface of the respective particles.

In addition, in Patent Document 9, it is described that the positive electrode active substance is subjected to annealing treatment to reduce an amount of alkalis remaining therein. However, Patent Document 9 fails to improve cycle characteristics of the positive electrode active substance to a sufficient extent merely by improving a crystal structure of a surface thereof by the annealing treatment solely.

In addition, in Patent Document 10, it is described that a precursor of Li—Ni composite oxide is surface-coated with sodium aluminate to improve a high capacity, a filling property and a storage property of the resulting Li—Ni composite oxide. However, there is no descriptions concerning a gradient of a concentration of Al in the Li—Ni composite oxide produced by mixing a lithium compound with the precursor and calcining the obtained mixture. Thus, the technique described in Patent Document 10 fails to improve cycle characteristics of the Li—Ni composite oxide to a sufficient extent.

Also, in Patent Documents 11 and 12, it is described that Li—Ni composite oxide having a different composition and Li—Mn composite oxide are deposited or adhered onto the surface of the Li—Ni composite oxide, or the amounts of these materials deposited or adhered onto the surface of the Li—Ni composite oxide are increased to form a coating layer thereon, thereby improving a thermal stability thereof. However, Patent Documents 11 and 12 fail to improve cycle characteristics of the Li—Ni composite oxide only by forming the coating layer thereon.

Also, in Patent Document 13, it is described that Li—Ni composite oxide is neutralized with an acid aqueous solution having a pH value of 3.0 to 6.0, and the obtained neutralized product is removed by water-washing treatment, thereby preventing corrosion or peel-off of a current collector and improving cycle characteristics of the Li—Ni composite oxide. However, there are no descriptions concerning an amount and a concentration gradient of the amphoteric metal present in the Li—Ni composite oxide. Thus, the technique described in Patent Document 13 fails to improve cycle characteristics of the Li—Ni composite oxide by itself.

Thus, it has been required to provide Li—Ni composite oxide as a positive electrode active substance for a non-aqueous electrolyte secondary battery which is capable of exhibiting good cycle characteristics and reducing an amount of gases generated therefrom upon charging under high-temperature conditions.

In consequence, an object of the present invention is to provide Li—Ni composite oxide particles capable of reducing an amount of gases generated therefrom upon charging under high-temperature conditions and exhibiting good cycle characteristics when used as a positive electrode active substance for a non-aqueous electrolyte secondary battery.

Means for Solving the Problem

The above object or technical task can be achieved by the following aspects of the present invention.

That is, according to the present invention, there are provided Li—Ni composite oxide particles having a composition represented by the formula:

$Li_x(Ni_{1-y-w-z-v}Co_yMn_wMa_zMb_v)O_2$ (wherein $0.9 \le x \le 1.1$; $0.05 \le y \le 0.25$; $0 \le w \le 0.25$; $0 < z \le 0.15$; $0 \le v \le 0.03$; Ma is at least one amphoteric metal selected from the group consisting of Al, Zn and Sn; and Mb is at least one metal selected from the group consisting of Bi, Sb, Zr, B and Mg), in which the Li—Ni composite oxide particles have a BET specific surface area of 0.05 to 0.8 m²/g; an atomic ratio (Ma/Ni) of a concentration of the amphoteric metal to a concentration of Ni on an outermost surface of the respective Li—Ni composite oxide particles is 2 to 6; and the concentration of the amphoteric metal on the outermost surface of the respective Li—Ni composite oxide particles is higher than a concentration of the amphoteric metal at a position spaced by 50 nm from the outermost surface toward a center of the respective Li—Ni composite oxide particles (Invention 1).

Also, according to the present invention, there are provided the Li—Ni composite oxide particles as describe in the above Invention 1, wherein the concentration of the amphoteric metal on the outermost surface of the respective Li—Ni composite oxide particles is 5 to 60 atom % based on a total concentration of Ni, Co, Mn, the amphoteric metal (Ma), Mb and oxygen (Invention 2).

Also, according to the present invention, there are provided the Li—Ni composite oxide particles as describe in the above Invention 1 or 2, wherein the Li—Ni composite oxide particles have an average secondary particle diameter of 1 to 30 μm (Invention 3).

Also, according to the present invention, there are provided the Li—Ni composite oxide particles as describe in any one of the above Inventions 1 to 3, wherein the Li—Ni composite oxide particles have a content of lithium hydroxide of not more than 0.25% by weight, and a content of lithium carbonate of not more than 0.20% by weight (Invention 4).

Also, according to the present invention, there are provided the Li—Ni composite oxide particles as describe in any one of the above Inventions 1 to 4, wherein the Li—Ni composite oxide particles have a sulfur content of not more than 100 ppm, and a sodium content of not more than 100 ppm (Invention 5).

In addition, according to the present invention, there is provided a process for producing the Li—Ni composite oxide particles as described in any one of the above Inventions 1 to 5, comprising:

a water-washing step of adjusting a pH value of a slurry prepared by dispersing the Li—Ni composite oxide particles in water to 5.0 to 11.0 while stirring; and a heat-treating step of annealing the Li—Ni composite oxide particles obtained by successively subjecting the particles obtained after the water-washing step to filtration, rinsing and drying, in a temperature range of 450 to 850° C. in an oxygen-containing atmosphere having a carbon dioxide gas concentration of not more than 100 ppm (Invention 6).

Further, according to the present invention, there is provided a non-aqueous electrolyte secondary battery comprising a positive electrode comprising a positive electrode active substance formed from the Li—Ni composite oxide particles as described in any one of the above Inventions 1 to 5 (Invention 7).

Effect of the Invention

The Li—Ni composite oxide particles according to the present invention are provided on a surface thereof with a thin uniform coating layer having a high amphoteric metal concentration, and therefore the resulting secondary battery can be prevented from generating gases owing to decomposition of an electrolyte solution upon charging and discharging under high-temperature conditions, and can exhibit good cycle characteristics.

In addition, the Li—Ni composite oxide particles according to the present invention have a less content of impurities such as a carbonate and a hydroxide of surplus lithium or the like, and therefore the resulting secondary battery can be prevented from generating gases owing to decomposition of an electrolyte solution upon charging and discharging under high-temperature conditions, and can exhibit good cycle characteristics.

Consequently, the Li—Ni composite oxide particles according to the present invention can be suitably used as a positive electrode active substance for a non-aqueous electrolyte secondary battery.

PREFERRED EMBODIMENT FOR CARRYING OUT THE INVENTION

Figure 1:
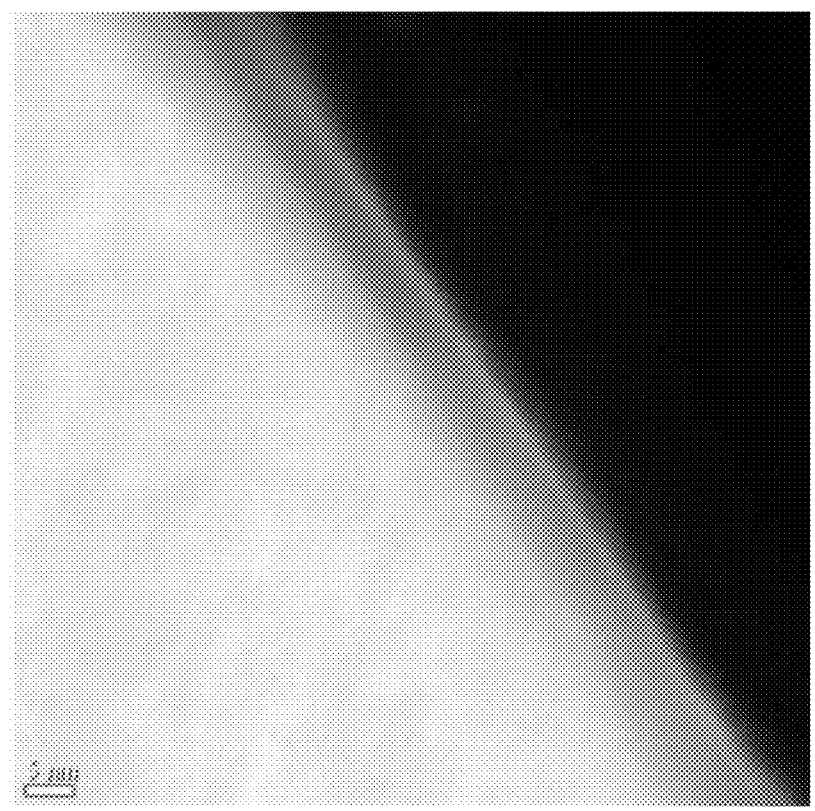
FIG. 1 is an micrographic image of a section of the Li—Ni composite oxide particles obtained in Example 1 as observed by STEM-EDX.

The construction of the present invention is described in detail below.

First, the Li—Ni composite oxide particles according to the present invention are described.

The Li—Ni composite oxide particles according to the present invention have a composition represented by the formula:

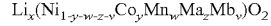
$Li_x(Ni_{1-y-w-z-v}Co_yMn_wMa_zMb_v)O_2$ (wherein $0.9 \leq x \leq 1.1$; $0.05 \leq y \leq 0.25$; $0 \leq w \leq 0.25$; $0 < z \leq 0.15$; $0 \leq v \leq 0.03$; Ma is at least one amphoteric metal selected from the group consisting of Al, Zn and Sn; and Mb is at least one metal selected from the group consisting of Bi, Sb, Zr, B and Mg).

The Li—Ni composite oxide particles preferably have a composition of the above formula in which $0.95 \leq x \leq 1.10$; $0.07 \leq y \leq 0.23$; $0 \leq w \leq 0.23$; $0.01 \leq z \leq 0.13$; $0 \leq v \leq 0.025$, and more preferably a composition of the above formula in which $0.98 \leq x \leq 1.05$; $0.08 \leq y \leq 0.20$; $0 \leq w \leq 0.20$; $0.03 \leq z \leq 0.10$; $0 \leq v \leq 0.02$.

In the Li—Ni composite oxide particles according to the present invention, an atomic ratio (Ma/Ni) of a concentration of the amphoteric metal to a concentration of Ni on an outermost surface of the respective Li—Ni composite oxide particles is 2 to 6, and the concentration of the amphoteric metal on the outermost surface of the respective Li—Ni composite oxide particles is higher than a concentration of the amphoteric metal at a position spaced by 50 nm from the outermost surface toward a center of the respective Li—Ni composite oxide particles. With the provision of a layer having a high amphoteric metal concentration on the outermost surface of the respective particles, it is possible to suppress generation of gases from the particles. When the atomic ratio (Ma/Ni) of a concentration of the amphoteric metal to a concentration of Ni on the outermost surface of the respective Li—Ni composite oxide particles is less than 2, it may be difficult to attain the above aimed effects of the present invention to a sufficient extent. When the atomic ratio (Ma/Ni) is more than 6, the secondary battery obtained using the Li—Ni composite oxide particles tends to be deteriorated in discharge capacity. The atomic ratio (Ma/Ni) of a concentration of the amphoteric metal to a concentration of Ni on the outermost surface of the respective Li—Ni composite oxide particles is preferably 2 to 5.5, and more preferably 2.3 to 5.0. Meanwhile, the concentration of the amphoteric metal on the outermost surface of the respective Li—Ni composite oxide particles, the concentration of the amphoteric metal at a position spaced by 50 nm from the outermost surface toward a center of the respective Li—Ni composite oxide particles, and the atomic ratio (Ma/Ni) of a concentration of the amphoteric metal to a concentration of Ni on the outermost surface of the respective Li—Ni composite oxide particles, may be determined, for example, by STEM-EDX analysis using a field emission-type electron microscope as described in Examples below. Also, the outermost surface of the respective Li—Ni composite oxide particles as described in the present invention means a surface of primary particles present on an outermost surface of behaving particles (secondary particles) recognized from an STEM image.

The concentration of the amphoteric metal on the outermost surface of the respective Li—Ni composite oxide particles according to the present invention is preferably 5 to 60 atom % based on a total concentration of Ni, Co, Mn, the amphoteric metal (Ma), Mb and oxygen. When the concentration of the amphoteric metal on the outermost surface of the respective particles is less than 5 atom %, it may be difficult to attain the above aimed effects of the present invention to a sufficient extent. When the concentration of the amphoteric metal on the outermost surface of the respective particles is more than 60 atom %, the secondary battery obtained using the Li—Ni composite oxide particles tends to be deteriorated in discharge capacity. The concentration of the amphoteric metal on the outermost surface of the respective Li—Ni composite oxide particles is more preferably 15 to 55 atom %.

The average primary particle diameter of primary particles constituting secondary particles of the Li—Ni composite oxide particles according to the present invention is preferably 0.1 to 4 μm. When the average primary particle diameter of the Li—Ni composite oxide particles lies within the above-specified range, the resulting non-aqueous electrolyte secondary battery can exhibit good charge/discharge characteristics under high-temperature conditions with a less amount of gases generated. When the average primary particle diameter of the Li—Ni composite oxide particles is more than 4 μm, the secondary battery produced using the Li—Ni composite oxide particles tends to be deteriorated in initial discharge capacity owing to a high diffusion resistance of lithium ions. When the average primary particle diameter of the Li—Ni composite oxide particles is less than 0.1 μm, small primary particles tend to be produced if the particles are broken by compression upon production of an electrode, so that the reaction between the particles and an electrolyte solution tends to become violent on a boundary between the particles. The average primary particle diameter of the Li—Ni composite oxide particles is more preferably 1 to 3 μm.

The average secondary particle diameter (D50) of the Li—Ni composite oxide particles according to the present invention is preferably 1.0 to 30 μm. When the average secondary particle diameter (D50) of the Li—Ni composite oxide particles is less than 1.0 μm, the Li—Ni composite oxide particles tend to be deteriorated in packing density and suffer from increase in reactivity with an electrolyte solution. When the average secondary particle diameter (D50) of the Li—Ni composite oxide particles is more than 30 μm, it may be difficult to industrially produce such particles. The average secondary particle diameter (D50) of the Li—Ni composite oxide particles is preferably 3.0 to 28.0 μm.

The BET specific surface area of the Li—Ni composite oxide particles according to the present invention is 0.05 to 0.8 m$^2$/g. When the BET specific surface area of the Li—Ni composite oxide particles is less than 0.05 m$^2$/g, the secondary battery produced using the Li—Ni composite oxide particles tends to be deteriorated in cycle characteristics. When the BET specific surface area of the Li—Ni composite oxide particles is more than 0.8 m$^2$/g, the secondary battery produced using the Li—Ni composite oxide particles tends to be deteriorated in storage property. The BET specific surface area of the Li—Ni composite oxide particles is preferably 0.06 to 0.7 m$^2$/g.

The content of lithium hydroxide in the Li—Ni composite oxide particles according to the present invention is preferably not more than 0.25% by weight, and the content of lithium carbonate in the Li—Ni composite oxide particles according to the present invention is preferably not more than 0.20% by weight. When the contents of lithium hydroxide and lithium carbonate in the Li—Ni composite oxide particles lies within the above-specified ranges, the secondary battery produced using the Li—Ni composite oxide particles can exhibit good charge/discharge characteristics under high-temperature conditions with a less amount of gases generated. When the lithium hydroxide content of the Li—Ni composite oxide particles is more than 0.25% by weight and the lithium carbonate content of the Li—Ni composite oxide particles is more than 0.20% by weight, the resulting secondary battery tends to suffer from accelerated decomposition of an electrolyte solution by the alkali upon charging and discharging under high-temperature conditions, so that severe generation of gases therefrom tends to be caused. The content of lithium hydroxide in the Li—Ni composite oxide particles is more preferably not more than 0.20% by weight, and the content of lithium carbonate in the Li—Ni composite oxide particles is more preferably not more than 0.15% by weight, and the contents of lithium hydroxide and lithium carbonate in the Li—Ni composite oxide particles are preferably as small as possible.

The sulfur content of the Li—Ni composite oxide particles according to the present invention is preferably not more than 100 ppm. When the sulfur content of the Li—Ni composite oxide particles is more than 100 ppm, the secondary battery produced using the Li—Ni composite oxide particles tends to be deteriorated in storage property. The sulfur content of the Li—Ni composite oxide particles is more preferably not more than 50 ppm.

The sodium content of the Li—Ni composite oxide particles according to the present invention is preferably not more than 100 ppm. When the sodium content of the Li—Ni composite oxide particles is more than 100 ppm, the secondary battery produced using the Li—Ni composite oxide particles tends to be deteriorated in storage property. The sodium content of the Li—Ni composite oxide particles is more preferably not more than 50 ppm.

The secondary particles of the Li—Ni composite oxide particles according to the present invention preferably have a spherical particle shape with less acute-angled portions.

Next, the process for producing the Li—Ni composite oxide particles according to the present invention is described.

The Li—Ni composite oxide particles according to the present invention may be produced by conducting a water-washing step of adjusting a pH value of a slurry prepared by dispersing the previously prepared Li—Ni composite oxide particles in water to 5.0 to 11.0 while stirring; and a heat-treating step of annealing the Li—Ni composite oxide particles obtained by successively subjecting the particles obtained after the water-washing step to filtration, rinsing and drying, in a temperature range of 450 to 850° C. in an oxygen-containing atmosphere having a carbon dioxide gas concentration of not more than 100 ppm.

The Li—Ni composite oxide particles to be treated by the process of the present invention may be obtained by any ordinary method, for example, the method of mixing a lithium compound, a nickel compound, a cobalt compound, a manganese compound, an Ma compound (in which Ma is Al, Zn or Sn) and an Mb compound (in which Mb is Bi, Sb, Zr, B or Mg) and subjecting the resulting mixture to heat treatment; the method of previously preparing a composite compound comprising nickel, cobalt, manganese, Ma and Mb and then mixing the composite compound with a lithium compound, followed by subjecting the resulting mixture to heat treatment; the method of mixing a lithium compound, a nickel compound, a cobalt compound, a manganese compound, an Ma compound and an Mb compound in a solution thereof and subjecting the resulting mixture to heat treatment, or the like.

Meanwhile, the molar ratio of Li/(Ni+Co+Mn+Ma+Mb) in the Li—Ni composite oxide particles to be treated is preferably 1.00 to 1.10. When the molar ratio of Li/(Ni+Co+Mn+Ma+Mb) is less than 1.00, the reaction between the respective elements tends to be insufficient, so that the resulting particles tend to be deteriorated in capacity. When the molar ratio of Li/(Ni+Co+Mn+Ma+Mb) is more than 1.10, an excessive amount of lithium components tend to be undesirably present in the respective particles. The molar ratio of Li/(Ni+Co+Mn+Ma+Mb) in the Li—Ni composite oxide particles to be treated is more preferably 1.02 to 1.08.

Also, the molar ratio of Ma/(Ni+Co+Mn+Ma+Mb) in the Li—Ni composite oxide particles to be treated is preferably 0.03 to 0.1. When the molar ratio of Ma/(Ni+Co+Mn+Ma+Mb) is less than 0.03, the resulting particles tend to be considerably deteriorated in cycle characteristics. When the molar ratio of Ma/(Ni+Co+Mn+Ma+Mb) is more than 0.1, the resulting particles tend to be deteriorated in capacity. The molar ratio of Ma/(Ni+Co+Mn+Ma+Mb) in the Li—Ni composite oxide particles to be treated is more preferably 0.035 to 0.05.

In the present invention, the Li—Ni composite oxide particles to be treated are preferably subjected to deaggregation before conducting the water-washing step.

In the present invention, with the above water-washing treatment, it is possible to remove surplus amounts of lithium hydroxide and lithium carbonate remaining in the reaction mixture after the calcination reaction of the Li—Ni composite oxide particles to be treated. Further, by controlling the pH value of a slurry upon the water-washing step, it is possible to suppress reduction in content of the amphoteric metal in the Li—Ni composite oxide particles.

In the present invention, it is preferred that the Li—Ni composite oxide particles to be treated are suspended in pure water used in an amount four to six times the amount of the particles before subjected to the water-washing treatment. When the amount of pure water used for suspending the particles is less than four times the amount of the particles, it may be difficult to well control the pH value of the resulting slurry because of an excessively high pH value thereof. When the amount of pure water used is more than six times the amount of the particles, lithium tends to be eluted out of the particles, so that the secondary battery produced using the resulting Li—Ni composite oxide particles tends to be deteriorated in capacity.

In particular, in the present invention, it is preferred that after the Li—Ni composite oxide particles to be treated are suspended in pure water in the water-washing treatment and the obtained suspension is allowed to stand until the increase in pH value of the slurry becomes moderate, the slurry is controlled in pH value thereof. With such a control of the pH value of the slurry, it is possible to suppress excessive elution of the amphoteric metal from the Li—Ni composite oxide particles, and increase the amphoteric metal concentration on the outermost surface of the Li—Ni composite oxide particles. More specifically, when dispersing the Li—Ni composite oxide particles in water in the water-washing treatment and controlling the pH value of the resulting suspension, it is possible to deposit the eluted amphoteric metal on the surface of the particles and thereby allow a thin uniform layer having a high amphoteric metal concentration to be present on the surface of the particles while maintaining an adequate amphoteric metal content in the particles. Therefore, in the present invention, in order to satisfy the atomic ratio (Ma/Ni) of the concentration of the amphoteric metal to the concentration of Ni on an outermost surface of the respective Li—Ni composite oxide particles as well as the relationship between the concentration of the amphoteric metal on the outermost surface of the respective Li—Ni composite oxide particles and the concentration of the amphoteric metal at a position spaced by 50 nm from the outermost surface toward a center of the respective Li—Ni composite oxide particles, for example, the pH value of the slurry can be controlled.

In the present invention, the pH value of the slurry is preferably controlled to 5.0 to 11.0 in the water-washing treatment. When the pH value of the slurry is out of the above-specified range, the amphoteric metal tends to remain eluted, so that the content of the amphoteric metal in the Li—Ni composite oxide particles tends to be reduced. In particular, it is preferred that the pH value of the slurry is maintained at the suitable predetermined value.

In the present invention, the treating time for controlling the pH value of the slurry is preferably 5 to 30 min. When the treating time for controlling the pH value of the slurry is shorter than 5 min, it may be difficult to sufficiently remove the surplus lithium from the Li—Ni composite oxide particles. When the treating time for controlling the pH value of the slurry is longer than 30 min, a large amount of lithium present in the particles tends to be eluted out therefrom, so that the secondary battery produced using the obtained Li—Ni composite oxide particles tends to be deteriorated in capacity.

In order to control the pH value of the slurry, there is preferably used an acid aqueous solution of sulfuric acid, phosphoric acid, nitric acid, hydrochloric acid, etc. Among these acid aqueous solutions, preferred is a sulfuric acid aqueous solution from the standpoint of a good industrial productivity although not particularly limited thereto. The concentration of the sulfuric acid aqueous solution is preferably $1/100$ N to $1/10$ N. When the concentration of the sulfuric acid aqueous solution is less than $1/100$ N, it tends to take a very long time to control the pH value of the slurry, so that the amount of the acid aqueous solution required for conducting the treatment tends to be undesirably increased. When the concentration of the sulfuric acid aqueous solution is more than $1/10$ N, the amount of Li eluted from the crystals when removing the surplus amount of lithium tends to be increased, so that the crystal structure tends to be broken.

Further, before controlling the pH value of the slurry, an acid or alkali solution comprising Ma ions may be added thereto. By adding the solution comprising Ma ions before controlling the pH value of the slurry, the concentration of Ma ions on the surface of the respective Li—Ni composite oxide particles can be readily controlled. As the acid solution comprising Ma ions, there are preferably used those acid aqueous solutions comprising sulfuric acid, phosphoric acid, nitric acid, hydrochloric acid, etc. Among these acid aqueous solutions, in view of industrial productivity, a sulfuric acid aqueous solution is preferably used although not particularly limited thereto. The concentration of the sulfuric acid aqueous solution comprising Ma ions is preferably $1/100$ N to $1/10$ N. When the concentration of the sulfuric acid aqueous solution is less than 1/100 N, it tends to take a very long time to control the pH value of the slurry, so that the amount of the acid aqueous solution required for conducting the treatment tends to be undesirably increased. When the concentration of the sulfuric acid aqueous solution is more than 1/10 N, the amount of Li eluted from the crystals when removing the surplus amount of lithium tends to be increased, so that the crystal structure tends to be broken. As the alkali solution comprising Ma ions, there is preferably used a solution prepared by dissolving an oxide of Ma in a sodium hydroxide solution. The concentration of the alkali solution comprising Ma ions is not particularly limited.

In the present invention, the water-washing treatment is preferably carried out at a water temperature of 10 to 25° C. When the water temperature is lower than 10° C., the rate of elution of the surplus lithium tends to be excessively low, so that the time required for removing the surplus lithium to a sufficient extent tends to be increased. When the water temperature is higher than 25° C., a large amount of lithium in the particles tends to be eluted out for a short period of time, so that the secondary battery obtained using the Li—Ni composite oxide particles tends to be deteriorated in capacity.

After the water-washing treatment followed by filtration, the obtained Li—Ni composite oxide particles are preferably subjected to additional washing treatment with pure water used in an amount 5 to 12 times the amount of the Li—Ni composite oxide. The additional washing treatment is conducted to remove the reaction products between acid components used for controlling the pH value of the slurry and the surplus lithium.

The Li—Ni composite oxide obtained after the additional washing treatment is preferably dried in a temperature range of 100 to 200° C. for 5 to 20 hr to remove remaining water therefrom to a sufficient extent.

Further, the Li—Ni composite oxide from which the surplus lithium has been removed is preferably subjected to heat treatment at a temperature of 450 to 850° C. When the heat treatment temperature is lower than 450° C., the resulting particles tend to have a large BET specific surface area, so that the amount of gases generated therefrom upon storage under high-temperature conditions tends to be increased. In the Li—Ni composite oxide particles having the above composition according to the present invention, when the heat treatment temperature is higher than 850° C., $Ni^{3+}$ in the particles tends to be reduced into $Ni^{2+}$, and tends to be included in an Li phase, so that it is not possible to maintain the layer structure. The heat treatment temperature is more preferably 480 to 800° C.

The heat treatment time is preferably 1 to 10 hr. When the heat treatment time is shorter than 1 hr, the crystallinity of the surface of the resulting particles tends to be hardly improved to a sufficient extent. The heat treatment time of longer than 10 hr tends to be undesirable from the viewpoints of productivity and costs.

The atmosphere used in the heat treatment is preferably an oxygen-containing atmosphere having a carbon dioxide gas concentration of not more than 100 ppm. When the carbon dioxide gas concentration of the heat treatment atmosphere is more than 100 ppm, the secondary battery produced using the obtained Li—Ni composite oxide particles tends to be deteriorated in cycle characteristics. Also, when using a reducing atmosphere such as nitrogen in the heat treatment, oxygen tends to be undesirably released upon the treatment. The heat treatment atmosphere is preferably an oxidative gas atmosphere, and more preferably an atmosphere having an oxygen concentration of not less than 70%.

Next, a positive electrode using the positive electrode active substance comprising the Li—Ni composite oxide particles according to the present invention is described.

When producing the positive electrode using the Li—Ni composite oxide particles according to the present invention, a conducting agent and a binder are added to and mixed with the positive electrode active substance by an ordinary method. Examples of the preferred conducting agent include acetylene black, carbon black and graphite. Examples of the preferred binder include polytetrafluoroethylene and polyvinylidene fluoride.

The secondary battery produced by using the Li—Ni composite oxide particles according to the present invention comprises the above positive electrode, a negative electrode and an electrolyte.

Examples of a negative electrode active substance which may be used for the negative electrode include metallic lithium, lithium/aluminum alloy, lithium/tin alloy, and graphite or black lead.

Also, as a solvent for the electrolyte solution, there may be used combination of ethylene carbonate and diethyl carbonate, as well as an organic solvent comprising at least one compound selected from the group consisting of carbonates such as propylene carbonate and dimethyl carbonate, and ethers such as dimethoxyethane.

Further, as the electrolyte, there may be used a solution prepared by dissolving lithium phosphate hexafluoride as well as at least one lithium salt selected from the group consisting of lithium perchlorate and lithium borate tetrafluoride in the above solvent.

The secondary battery produced by using the Li—Ni composite oxide particles according to the present invention has excellent properties such as a capacity retention rate as measured after 30 cycles of not less than 95.0%, and the amount of gases generated therefrom is as small as not more than 0.45 mL/g as measured by the below-mentioned evaluation method.

<Function>

In order to improve cycle characteristics of the resulting secondary battery, the composition of the Li—Ni composite oxide particles for a non-aqueous electrolyte secondary battery which constitutes the positive electrode active substance is important. For this reason, the cycle characteristics of the secondary battery have been improved by incorporating an amphoteric metal into the Li—Ni composite oxide particles in the form of a solid solution upon production of the Li—Ni composite oxide particles. In addition, suppression of generation of gases from an inside of the battery is important to obtain a good storage property thereof under high-temperature conditions. The generation of gases from an inside of the battery tends to be caused by accelerated decomposition of an electrolyte solution by alkalis upon charging/discharging under high-temperature conditions which will occur if a large amount of surplus lithium present in the positive electrode active substance remains in the battery, and such an increased amount of gases generated have a considerably large influence on the battery characteristics. In order to remove the surplus lithium, it is effective to wash the positive electrode active substance with water. However, during the water-washing treatment, the pH value of the slurry tends to be increased to cause elution of Al as an amphoteric metal therefrom, resulting in deteriorated cycle characteristics of the obtained secondary battery. Therefore, it is important to not only reduce the surplus lithium but also suppress elution of the amphoteric metal. However, the techniques described in the above prior art documents by themselves have failed to fully realize a non-aqueous electrolyte secondary battery capable of satisfying both of a good storage property under high-temperature conditions and excellent cycle characteristics.

In consequence, according to the present invention, surplus amounts of lithium hydroxide and lithium carbonate remaining in the Li—Ni composite oxide obtained by the calcination reaction are removed by the water-washing treatment, whereby it is possible to obtain the Li—Ni composite oxide particles having less contents of lithium hydroxide and lithium carbonate. Therefore, according to the present invention, it is possible to suppress a decomposition reaction of an electrolyte solution by alkalis upon charging/discharging of the secondary battery under high-temperature conditions, and reduce an amount of gases generated therefrom.

In addition, when dispersing the Li—Ni composite oxide particles in water upon the water-washing treatment and controlling a pH value of the obtained slurry, the amphoteric metal eluted is deposited on the surface of the respective particles, whereby a thin uniform layer having a high amphoteric metal concentration is allowed to be present on the surface of the respective particles while maintaining a suitable content of the amphoteric metal within the particles. For this reason, it is possible to allow the resulting secondary battery to exhibit excellent cycle characteristics.

Further, when the Li—Ni composite oxide particles from which lithium hydroxide and lithium carbonate are removed and on the surface of which a layer having a high amphoteric metal concentration is present are subjected again to heat treatment, the reaction is allowed to proceed uniformly, so that it is possible to obtain the Li—Ni composite oxide particles having high crystallinity, suppress generation of gases therefrom upon storage under high-temperature conditions, and maintain high cycle characteristics of the resulting secondary battery.

EXAMPLES

Typical embodiments of the present invention are described in more detail below.

The composition of the Li—Ni composite oxide particles according to the present invention were determined as follow. That is, the Li—Ni composite oxide particles were dissolved in an acid, and the resulting solution was analyzed by a plasma emission spectroscopic device "ICPS-7500" (manufactured by Shimadzu Corp.).

The gradient of a concentration of respective elements present within the particles and the condition of a section of the respective particles were determined by STEM-EDX analysis using a field emission-type electron microscope manufactured by JEOL Ltd. Meanwhile, the outermost surface of the respective the Li—Ni composite oxide particles means a surface of respective primary particles recognized from an STEM micrographic image.

The average primary particle diameter of the particles was determined from particle diameters of primary particles constituting the secondary particles observed using a scanning electron microscope "SEM-EDX" equipped with an energy disperse type X-ray analyzer (manufactured by Hitachi High-Technologies Corp.).

The average secondary particle diameter is a volume-average particle diameter as measured by a wet laser method using a laser type particle size distribution measuring apparatus "LMS-30" manufactured by Seishin Kigyo Co., Ltd.

The BET specific surface area of the particles was measured by BET method using nitrogen absorption.

The contents of lithium hydroxide and lithium carbonate as surplus lithium were determined as follows. That is, 20 g of the Li—Ni composite oxide particles were added to 100 mL of water, and the obtained slurry was stirred at room temperature for 20 min and then subjected to filtration to remove solids therefrom. The resulting supernatant liquid was subjected to titration using a 0.2N hydrochloric acid to plot a titer (mL) on an abscissa axis and a pH value of the supernatant liquid on an ordinate axis. From the resulting pH curve, two points at which an inclination of the curve became largest were determined as a first titration point having a smaller titer and a second titration point having a larger titer, and the contents of lithium hydroxide and lithium carbonate were calculated from the titers at the respective titration points according to the following calculation formulae.

Content of lithium hydroxide (% by weight)=
[(titer until reaching second titration point: mL)−2×{(titer until reaching second titration point: mL)−(titer until reaching first titration point: mL)}]×(concentration of hydrochloric acid used for titration: mol/L)×(factor of hydrochloric acid used for titration)×(molecular weight of lithium hydroxide)×2×100/((weight of particles: g)×1000)

Content of lithium carbonate (% by weight)={(titer until reaching second titration point: mL)−(titer until reaching first titration point: mL)}×(concentration of hydrochloric acid used for titration: mol/L)×(factor of hydrochloric acid used for titration)×(molecular weight of lithium carbonate)×2×100/((weight of particles: g)×1000)

The powder pH value of the particles was determined by measuring a pH value of a supernatant liquid of a suspension prepared by suspending 0.5 g of the particles in ion-exchanged water.

The sulfur content of the particles was determined as follows. That is, a sample was burnt in an oxygen flow in a combustion furnace to measure a sulfur content thereof using a carbon/sulfur measuring apparatus "EMIA-520" manufactured by Horiba Seisakusho Co., Ltd.

The sodium content of the particles was determined using the above plasma emission spectroscopic device "ICPS-7500" (manufactured by Shimadzu Corp.).

The coin cell produced using the Li—Ni composite oxide particles was evaluated for initial charge/discharge characteristics and cycle characteristics, and further the laminate cell produced therefrom was evaluated for a storage property under high temperature conditions.

First, 90% by weight of the Li—Ni composite oxide particles as a positive electrode active substance, 3% by weight of acetylene black and 3% by weight of a graphite "KS-16" both serving as a conducting material, and 4% by weight of polyvinylidene fluoride dissolved in N-methyl pyrrolidone as a binder, were mixed with each other, and the resulting mixture was applied onto an Al metal foil and then dried at 150° C. The thus obtained sheets were blanked into 16 mmφ and then compression-bonded to each other under a pressure of 1 t/cm², thereby producing an electrode having a thickness of 50 μm and using the thus produced electrode as a positive electrode. A metallic lithium blanked into 16 mmφ was used as a negative electrode, and a solution prepared by mixing EC and DMC each comprising 1 mol/L of $LiPF_6$ dissolved therein with each other at a volume ratio of 1:2 was used as an electrolyte solution, thereby producing a coin cell of a CR2032 type.

The coin cell was subjected to charge/discharge test for secondary batteries. Under the measuring conditions of a temperature of 25° C. and a cut-off voltage of 3.0 to 4.3 V, charge/discharge operations of the coin cell were repeated for 30 cycles. The measuring rate was 0.1C for the initial cycle only, and 1.0C for the 2nd or subsequent cycles.

Using the electrodes similar to those used for evaluation of the initial charge/discharge characteristics, four sets of the positive electrodes each having a size of 40×100 mm and the graphite negative electrodes each having the same size were combined so as to be opposed to each other, thereby producing a laminate cell.

The storage property under high-temperature conditions was evaluated as follows. The laminate cell thus produced was first subjected to initial charge/discharge cycle at room temperature, and then charged until reaching 4.2 V to measure a volume of the laminate cell at the voltage. Next, the laminate cell after the above measurement was stored under the environment of 85° C. for 24 hr and then the volume of the laminate cell was measured again to evaluate an amount of gases generated therefrom based on the change in volume of the laminate cell between before and after storage of the laminated cell under high-temperature conditions.

Example 1

An aqueous solution prepared by mixing 2 mol/L of nickel sulfate with cobalt sulfate at a mixing ratio of Ni:Co of 84:16, and a 5.0 mol/L ammonia aqueous solution were simultaneously fed to a reaction vessel.

The contents of the reaction vessel were always kept stirred by a blade-type stirrer and, at the same time, the reaction vessel was automatically supplied with a 2 mol/L sodium hydroxide aqueous solution so as to control the pH value of the contents in the reaction vessel to 11.5±0.5. The Ni—Co hydroxide produced in the reaction vessel was overflowed therefrom through an overflow pipe, and collected in a concentration vessel connected to the overflow pipe to concentrate the Ni—Co hydroxide in the reaction solution. The concentrated Ni—Co hydroxide solution was circulated to the reaction vessel, and the reaction was continued for 40 hr until the concentration of the Ni—Co hydroxide in the respective reaction solutions in the reaction vessel and the concentration vessel reached 4 mol/L.

After completion of the reaction, the resulting suspension was withdrawn from the reaction vessel, and washed with water in an amount of 10 times the weight of the Ni—Co hydroxide in the suspension using a filter press, and then dried, thereby obtaining hydroxide particles having a molar ratio of Ni:Co of 84.2:15.8 and an average secondary particle diameter of 15.1 μm.

The respective raw materials were weighed and mixed with each other such that the molar ratio between the Ni—Co hydroxide and aluminum hydroxide was Al/(Ni+Co+Al)=0.04, and the molar ratio between the Ni—Co hydroxide, aluminum hydroxide and lithium hydroxide monohydrate was Li/(Ni+Co+Al)=1.02. Thereafter, the resulting mixture was calcined in an oxygen atmosphere at 770° C. for 20 hr, thereby obtaining Li—Ni composite oxide particles. The obtained Li—Ni composite oxide particles had a chemical composition of $Li_{1.02}Ni_{0.8}Co_{0.15}Al_{0.04}O_2$.

The thus obtained Li—Ni composite oxide particles were deaggregated, and 1.5 kg of the deaggregated Li—Ni composite oxide particles were suspended in 7.5 L of pure water to prepare a slurry. Immediately after the pH value of the slurry reached 12.36 and the increase in pH value of the slurry became moderate, a 1/50N sulfuric acid aqueous solution was added thereto, and while continuously controlling the pH value of the slurry to 9.0, the slurry was stirred for 9 min and subjected to water-washing treatment. The thus water-washed slurry was subjected to filtration and then to additional water-washing treatment with 15 L of pure water, and further dried at 120° C. for 20 hr, thereby obtaining Li—Ni composite oxide particles. The thus obtained Li—Ni composite oxide particles were deaggregated again and then heat-treated at 700° C. in an oxygen atmosphere for 3 hr.

As a result of ICP analysis, it was confirmed that the obtained Li—Ni composite oxide particles had a composition of $Li_{0.99}Ni_{0.8}Co_{0.15}Al_{0.04}O_2$ which showed Al/(Ni+Co+Al)=0.04 and an Al residual rate of 100.0%. Therefore, it was confirmed that no change in content of Al in the particles between before and after the water-washing treatment occurred. In addition, as a result of STEM-EDX analysis, it was confirmed that the concentration of the amphoteric metal on an outermost surface (0 nm) of the Li—Ni composite oxide particles was 43.3 atom % based on a total concentration of Ni, Co, the amphoteric metal and oxygen, the atomic ratio (Ma/Ni) of the concentration of the amphoteric metal to a concentration of Ni on the outermost surface of the Li—Ni composite oxide particles was 4.16, and the concentration of the amphoteric metal on the outermost surface (0 nm) of the particles was higher than the concentration of the amphoteric metal at a position spaced by 50 nm from the outermost surface toward a center of the respective particles. In addition, it was confirmed that the Li—Ni composite oxide particles had an average secondary particle diameter of 12.7 μm and a BET specific surface area of 0.14 m²/g.

Further, 20 g of the Li—Ni composite oxide particles were suspended in 100 mL of water for 10 min while stirring, and then a supernatant liquid was separated by filtration and subjected to titration to measure and evaluate contents of lithium hydroxide and lithium carbonate therein. As a result, it was confirmed that the supernatant liquid had a lithium hydroxide content of 0.12% by weight and a lithium carbonate content of 0.07% by weight. Also, it was confirmed that the Li—Ni composite oxide particles had a sulfur content of 18 ppm and a sodium content of not more than 5 ppm.

In addition, it was confirmed that the cell produced using the Li—Ni composite oxide particles had a discharge capacity of 187 mA/g and a capacity retention rate after 30 cycles of 95.3%, and the amount of gases generated therefrom was 0.19 mL/g as measured after storing the cell at 85° C. for 24 hr.

Example 2

The same procedure as in Example 1 was conducted except that the respective raw materials were mixed with each other such that the molar ratio between the Ni—Co hydroxide, aluminum hydroxide and bismuth oxide was Al/(Ni+Co+Al+Bi)=0.04, and the molar ratio between lithium hydroxide monohydrate and the other metals was Li/(Ni+Co+Al+Bi)=1.02, thereby obtaining Li—Ni composite oxide particles having a different chemical composition from that in Example 1.

Example 3

The same procedure as in Example 1 was conducted except that the respective raw materials were mixed with each other such that the molar ratio between the Ni—Co hydroxide, aluminum hydroxide, bismuth oxide and antimony oxide was Al/(Ni+Co+Al+Bi+Sb)=0.04, and the molar ratio between lithium hydroxide monohydrate and the other metals was Li/(Ni+Co+Al+Bi+Sb)=1.02, thereby obtaining Li—Ni composite oxide particles having a different chemical composition from that in Example 1.

Examples 4 and 5

The same procedure as in Example 1 was conducted except that the pH value of the slurry upon washing the Li—Ni composite oxide particles with water was controlled to 6.5 and 10.5, respectively, thereby obtaining Li—Ni composite oxide particles.

Examples 6 and 7

The same procedure as in Example 1 was conducted except that the respective raw materials were weighed and mixed with each other such that the molar ratio between the Ni—Co hydroxide and aluminum hydroxide was Al/(Ni+Co+Al)=0.035 and 0.05, respectively, thereby obtaining Li—Ni composite oxide particles.

Examples 8 to 10

The same procedure as in Example 1 was conducted except that upon the water-washing treatment of the Li—Ni composite oxide particles, the pH value of the slurry was controlled using a diluted acid aqueous solution prepared by diluting phosphoric acid, cobalt sulfate heptahydrate and acetic acid, respectively, into a concentration of 1/50N, thereby obtaining Li—Ni composite oxide particles.

Examples 11 and 12

The same procedure as in Example 1 was conducted except that hydroxide particles having an average secondary particle diameter of 5.3 μm and hydroxide particles having an average secondary particle diameter of 23.6 μm were respectively used as the Ni—Co hydroxide to be calcined, thereby obtaining Li—Ni composite oxide particles.

Examples 13 and 14

The same procedure as in Example 1 was conducted except that the annealing temperature was controlled to 500° C. and 600° C., respectively, thereby obtaining Li—Ni composite oxide particles.

Example 15

The same procedure as in Example 1 was conducted except that the respective raw materials were mixed and calcined such that the molar ratios between the Ni—Co hydroxide, aluminum hydroxide and zinc hydroxide were Al/(Ni+Co+Al+Zn)=0.04 and Zn/(Ni+Co+Al+Zn)=0.01, and the molar ratio between lithium hydroxide monohydrate and the other metals was Li/(Ni+Co+Al+Zn)=1.02, thereby obtaining Li—Ni composite oxide particles.

Example 16

An aqueous solution prepared by mixing 2 mol/L of nickel sulfate with cobalt sulfate and manganese sulfate at a mixing ratio of Ni:Co:Mn of 80:10:10, and a 5.0 mol/L ammonia aqueous solution were simultaneously fed to a reaction vessel.

The contents of the reaction vessel were always kept stirred by a blade-type stirrer and, at the same time, the reaction vessel was automatically supplied with a 2 mol/L sodium hydroxide aqueous solution so as to control the pH value of the contents in the reaction vessel to 11.5±0.5. The Ni—Co—Mn hydroxide produced in the reaction vessel was overflowed therefrom through an overflow pipe, and collected in a concentration vessel connected to the overflow pipe to concentrate the Ni—Co—Mn hydroxide in the reaction solution. The concentrated Ni—Co—Mn hydroxide solution was circulated to the reaction vessel, and the reaction was continued for 40 hr until the concentration of the Ni—Co—Mn hydroxide in the respective reaction solutions in the reaction vessel and the concentration vessel reached 4 mol/L.

After completion of the reaction, the resulting suspension was withdrawn from the reaction vessel, and washed with water in an amount of 10 times the weight of the Ni—Co—Mn hydroxide in the suspension using a filter press, and then dried, thereby obtaining hydroxide particles having a molar ratio of Ni:Co:Mn of 80:10:10 and an average secondary particle diameter of 15.1 μm.

The respective raw materials were weighed and mixed with each other such that the molar ratio between the Ni—Co—Mn hydroxide and aluminum hydroxide was Al/(Ni+Co+Mn+Al)=0.01, and the molar ratio between the Ni—Co hydroxide, aluminum hydroxide and lithium hydroxide monohydrate was Li/(Ni+Co+Mn+Al)=1.04. Thereafter, the resulting mixture was calcined in an oxygen atmosphere at 770° C. for 20 hr, thereby obtaining Li—Ni composite oxide particles. The obtained Li—Ni composite oxide particles had a chemical composition of $Li_{1.04}Ni_{0.792}Co_{0.099}Mn0_{0.099}Al_{0.01}O_2$.

The thus obtained Li—Ni composite oxide particles were deaggregated, and 1.5 kg of the deaggregated Li—Ni composite oxide particles were suspended in 7.5 L of pure water to prepare a slurry. Immediately after the pH value of the slurry reached 12.28 and the increase in pH value of the slurry became moderate, a 1/50N sulfuric acid aqueous solution was added thereto, and while continuously controlling the pH value of the slurry to 9.0, the slurry was stirred for 9 min and subjected to water-washing treatment. The thus water-washed slurry was subjected to filtration and then to additional water-washing treatment with 15 L of pure water, and further dried at 120° C. for 20 hr, thereby obtaining Li—Ni composite oxide particles. The thus obtained Li—Ni composite oxide particles were deaggregated again and then heat-treated at 700° C. in an oxygen atmosphere for 3 hr.

As a result of ICP analysis, it was confirmed that the obtained Li—Ni composite oxide particles had a composition of $Li_{1.01}Ni_{0.792}Co_{0.099}Mn_{0.099}Al_{0.01}O_2$ which showed Al/(Ni+Co+Mn+Al)=0.01 and an Al residual rate of 100.0%. Therefore, it was confirmed that no change in content of Al in the particles between before and after the water-washing treatment occurred. In addition, as a result of STEM-EDX analysis, it was confirmed that the concentration of the amphoteric metal on an outermost surface of the Li—Ni composite oxide particles was 40.5 atom % based on a total concentration of Ni, Co, Mn, the amphoteric metal and oxygen, the atomic ratio (Ma/Ni) of the concentration of the amphoteric metal to a concentration of Ni on the outermost surface of the Li—Ni composite oxide particles was 3.75, and the concentration of the amphoteric metal on the outermost surface (0 nm) of the particles was higher than the concentration of the amphoteric metal at a position spaced by 50 nm from the outermost surface toward a center of the respective particles. In addition, it was confirmed that the Li—Ni composite oxide particles had an average secondary particle diameter of 9.9 μm and a BET specific surface area of 0.22 m$^2$/g.

Further, 20 g of the Li—Ni composite oxide particles were suspended in 100 mL of water for 10 min while stirring, and then a supernatant liquid was separated by filtration and subjected titration to measure and evaluate contents of lithium hydroxide and lithium carbonate therein. As a result, it was confirmed that the supernatant liquid had a lithium hydroxide content of 0.12% by weight and a lithium carbonate content of 0.04% by weight. Also, it was confirmed that the Li—Ni composite oxide particles had a sulfur content of 19 ppm and a sodium content of not more than 5 ppm.

In addition, it was confirmed that the cell produced using the Li—Ni composite oxide particles had a discharge capacity of 204 mA/g and a capacity retention rate after 30 cycles of 95.3%, and the amount of gases generated therefrom was 0.17 mL/g as measured after storing the cell at 85° C. for 24 hr.

Example 17

The same procedure as in Example 16 was conducted except that the respective raw materials were mixed with each other such that the molar ratio between the Ni—Co—Mn hydroxide and aluminum hydroxide was Al/(Ni+Co+Mn+Al)=0.10, and the molar ratio between lithium hydroxide monohydrate and the other metals was Li/(Ni+Co+Mn+Al)=1.04, thereby obtaining Li—Ni composite oxide particles having a chemical composition of $Li_{1.01}Ni_{0.72}Co_{0.09}Mn_{0.09}Al_{0.1}O_2$.

Example 18

The same procedure as in Example 16 was conducted except that the respective raw materials were mixed with each other such that the molar ratios between the Ni—Co—Mn hydroxide, aluminum hydroxide and zirconium oxide were Al/(Ni+Co+Mn+Al+Zr)=0.01 and Zr/(Ni+Co+Mn+Al+Zr)=0.02, and the molar ratio between lithium hydroxide monohydrate and the other metals was Li/(Ni+Co+Mn+Al+Zr)=1.04, thereby obtaining Li—Ni composite oxide particles having a chemical composition of $Li_{1.01}Ni_{0.776}Co_{0.097}Mn_{0.097}Al_{0.01}Zr_{0.02}O_2$.

Example 19

The same procedure as in Example 16 was conducted except that the respective raw materials were mixed with each other such that the molar ratios between the Ni—Co—Mn hydroxide, aluminum hydroxide and magnesium hydroxide were Al/(Ni+Co+Mn+Al+Mg)=0.01 and Mg/(Ni+Co+Mn+Al+Mg)=0.02, and the molar ratio between lithium hydroxide monohydrate and the other metals was Li/(Ni+Co+Mn+Al+Mg)=1.04, thereby obtaining Li—Ni composite oxide particles having a chemical composition of $Li_{1.01}Ni_{0.776}Co_{0.097}Mn_{0.097}Al_{0.01}Mg_{0.02}O_2$.

Example 20

The same procedure as in Example 16 was conducted except that the respective raw materials were mixed with each other such that the molar ratio between the Ni—Co—Mn hydroxide and aluminum hydroxide was Al/(Ni+Co+Mn+Al)=0.05, and the molar ratio between lithium hydroxide monohydrate and the other metals was Li/(Ni+Co+Mn+Al)=1.04, thereby obtaining Li—Ni composite oxide particles having a chemical composition of $Li_{1.01}Ni_{0.76}Co_{0.095}Mn_{0.095}Al_{0.05}O_2$.

Example 21

The same procedure as in Example 16 was conducted except that the respective raw materials were mixed with each other such that the molar ratio between the Ni—Co—Mn hydroxide, aluminum hydroxide and bismuth oxide was Al/(Ni+Co+Al+Bi)=0.01, and the molar ratio between lithium hydroxide monohydrate and the other metals was Li/(Ni+Co+Al+Bi)=1.04, thereby obtaining Li—Ni composite oxide particles having a different chemical composition from that in Example 16.

Example 22

The same procedure as in Example 16 was conducted except that the respective raw materials were mixed with each other such that the molar ratio between the Ni—Co—Mn hydroxide, aluminum hydroxide, bismuth oxide and antimony oxide was Al/(Ni+Co+Al+Bi+Sb)=0.01, and the molar ratio between lithium hydroxide monohydrate and the other metals was Li/(Ni+Co+Al+Bi+Sb)=1.04, thereby obtaining Li—Ni composite oxide particles having a different chemical composition from that in Example 16.

Example 23

The same procedure as in Example 16 was conducted except that upon the water-washing treatment of the Li—Ni composite oxide particles, a predetermined amount of $NaAlO_2$ was added before the pH value of the slurry was controlled, thereby obtaining Li—Ni composite oxide particles having a chemical composition of $Li_{1.01}Ni_{0.7888}Co_{0.0986}Mn_{0.0986}Al_{0.014}O_2$.

Example 24

The same procedure as in Example 16 was conducted except that upon the water-washing treatment of the Li—Ni composite oxide particles, the pH value of the slurry was controlled by adding aluminum sulfate octadecahydrate and then using a diluted sulfuric acid aqueous solution having a concentration of 1/50N, thereby obtaining Li—Ni composite oxide particles having a chemical composition of $Li_{1.01}Ni_{0.7888}Co_{0.0986}Mn_{0.0986}Al_{0.014}O_2$.

Example 25

The same procedure as in Example 16 was conducted except that the respective raw materials were calcined such that the molar ratios between the Ni—Co—Mn hydroxide, aluminum hydroxide and zinc hydroxide were Al/(Ni+Co+Al+Zn)=0.01 and Zn/(Ni+Co+Al+Zn)=0.01, and the molar ratio between lithium hydroxide monohydrate and the other metals was Li/(Ni+Co+Mn+Zn)=1.04, thereby obtaining Li—Ni composite oxide particles having a chemical composition of $Li_{1.01}Ni_{0.784}Co_{0.09}Mn_{0.098}Al_{0.01}Zn_{0.01}O_2$.

Example 26

The same procedure as in Example 16 was conducted except that an aqueous solution prepared by mixing 2 mol/L of nickel sulfate with cobalt sulfate and manganese sulfate at a mixing ratio of Ni:Co:Mn of 60:20:20, and a 5.0 mol/L ammonia aqueous solution were simultaneously fed to a reaction vessel, thereby obtaining Li—Ni composite oxide particles having a chemical composition of $Li_{1.01}Ni_{0.594}Co_{0.198}Mn_{0.198}Al_{0.01}O_2$.

Example 27

The same procedure as in Example 25 was conducted except that the respective raw materials were mixed with each other such that the molar ratio between the Ni—Co—Mn hydroxide and aluminum hydroxide was Al/(Ni+Co+Mn+Al)=0.10, and the molar ratio between lithium hydroxide monohydrate and the other metals was Li/(Ni+Co+Mn+Al)=1.04, thereby obtaining Li—Ni composite oxide particles having a chemical composition of $Li_{1.00}Ni_{0.54}Co_{0.18}Mn_{0.18}Al_{0.1}O_2$.

Example 28

The same procedure as in Example 25 was conducted except that the respective raw materials were mixed with each other such that the molar ratios between the Ni—Co—Mn hydroxide, aluminum hydroxide and zirconium oxide were Al/(Ni+Co+Mn+Al+Zr)=0.01 and Zr/(Ni+Co+Mn+Al+Zr)=0.02, and the molar ratio between lithium hydroxide monohydrate and the other metals was Li/(Ni+Co+Mn+Al+Zr)=1.04, thereby obtaining Li—Ni composite oxide particles having a chemical composition of $Li_{1.01}Ni_{0.582}Co_{0.194}Mn_{0.194}Al_{0.01}Zr_{0.02}O_2$.

Example 29

The same procedure as in Example 25 was conducted except that the respective raw materials were mixed with each other such that the molar ratios between the Ni—Co—Mn hydroxide, aluminum hydroxide and magnesium hydroxide were Al/(Ni+Co+Mn+Al+Mg)=0.01 and Mg/(Ni+Co+Mn+Al+Mg)=0.02, and the molar ratio between lithium hydroxide monohydrate and the other metals was Li/(Ni+Co+Mn+Al+Mg)=1.04, thereby obtaining Li—Ni composite oxide particles having a chemical composition of $Li_{1.01}Ni_{0.582}Co_{0.194}Mn_{0.194}Al_{0.01}Mg_{0.02}O_2$.

Example 30

The same procedure as in Example 25 was conducted except that the respective raw materials were mixed with each other such that the molar ratio between the Ni—Co—Mn hydroxide and aluminum hydroxide was Al/(Ni+Co+Mn+Al)=0.05, and the molar ratio between lithium hydroxide monohydrate and the other metals was Li/(Ni+Co+Mn+Al)=1.04, thereby obtaining Li—Ni composite oxide particles having a chemical composition of $Li_{1.01}Ni_{0.57}Co_{0.19}Mn_{0.19}Al_{0.05}O_2$.

Example 31

The same procedure as in Example 25 was conducted except that the respective raw materials were mixed with each other such that the molar ratio between the Ni—Co—Mn hydroxide, aluminum hydroxide and bismuth oxide was Al/(Ni+Co+Al+Bi)=0.01, and the molar ratio between lithium hydroxide monohydrate and the other metals was Li/(Ni+Co+Al+Bi)=1.04, thereby obtaining Li—Ni composite oxide particles having a different chemical composition from that in Example 25.

Example 32

The same procedure as in Example 25 was conducted except that the respective raw materials were mixed with each other such that the molar ratio between the Ni—Co—Mn hydroxide, aluminum hydroxide, bismuth oxide and antimony oxide was Al/(Ni+Co+Al+Bi+Sb)=0.01, and the molar ratio between lithium hydroxide monohydrate and the other metals was Li/(Ni+Co+Al+Bi+Sb)=1.04, thereby obtaining Li—Ni composite oxide particles having a different chemical composition from that in Example 25.

Example 33

The same procedure as in Example 25 was conducted except that the respective raw materials were mixed and calcined such that the molar ratios between the Ni—Co—Mn hydroxide, aluminum hydroxide and zinc hydroxide were Al/(Ni+Co+Al+Zn)=0.01 and Zn/(Ni+Co+Al+Zn)=0.01, and the molar ratio between lithium hydroxide monohydrate and the other metals was Li/(Ni+Co+Mn+Zn)=1.04, thereby obtaining Li—Ni composite oxide particles having a chemical composition of $Li_{1.00}Ni_{0.588}Co_{0.196}Mn_{0.196}Al_{0.01}Zn_{0.01}O_2$.

Comparative Example 1

The Li—Ni composite oxide particles obtained by the calcination in the same manner as in Example 1 were subjected to no water-washing treatment. Further, 20 g of the resulting Li—Ni composite oxide particles were suspended in 100 mL of water for 10 min while stirring, and then a supernatant liquid was separated by filtration and subjected to titration to measure and evaluate contents of lithium hydroxide and lithium carbonate therein. As a result, it was confirmed that the supernatant liquid had a lithium hydroxide content of 0.46% by weight and a lithium carbonate content of 0.40% by weight. Also, it was confirmed that the cell produced using the Li—Ni composite oxide particles had a discharge capacity of 192 mA/g and a cycle characteristic of 95.3%, and the amount of gases generated therefrom was 1.88 mL/g as measured after storing the cell at 85° C. for 24 hr.

Comparative Example 2

The Li—Ni composite oxide particles obtained by the calcination in the same manner as in Example 1 were suspended in pure water and stirred for 10 min to subject the particles to water-washing treatment. The resulting suspension was subjected to filtration and then additional washing treatment without previously controlling the pH value of the slurry during the water-washing treatment. At this time, the pH value of the slurry was 12.6. Thereafter, the resulting particles were subjected to annealing treatment at 700° C. in an oxygen-containing atmosphere for 3 hr. As a result of ICP analysis, it was confirmed that the content of Al in the resulting Li—Ni composite oxide particles was Al/(Ni+Co+Al)=0.035 which showed an Al residual rate of 87.5%. Therefore, there was recognized such a tendency that the Al content in the Li—Ni composite oxide particles after the water-washing treatment was considerably reduced as compared to that before the water-washing treatment. Further, 20 g of the resulting Li—Ni composite oxide particles were suspended in 100 mL of water for 10 min while stirring, and then a supernatant liquid was separated by filtration and subjected to titration to measure and evaluate contents of lithium hydroxide and lithium carbonate therein. As a result, it was confirmed that the supernatant liquid had a lithium hydroxide content of 0.14% by weight and a lithium carbonate content of 0.06% by weight. Also, it was confirmed that the cell produced using the Li—Ni composite oxide particles had a discharge capacity of 189 mA/g and a capacity retention rate after 30 cycles of 91.1%, and the amount of gases generated therefrom was 0.39 mL/g as measured after storing the cell at 85° C. for 24 hr.

Comparative Example 3

The Li—Ni composite oxide particles obtained by the calcination in the same manner as in Example 1 were subjected to water-washing treatment. After controlling the pH value of the slurry during the water-washing treatment to 3.0, the slurry was subjected to filtration, and the resulting particles were subjected to additional washing treatment with water in an amount of 10 times the amount of the resulting particles and further subjected to annealing treatment at 700° C. in an oxygen-containing atmosphere for 3 hr.

Comparative Example 4

The Li—Ni composite oxide particles obtained by the calcination in the same manner as in Example 1 were subjected to water-washing treatment. After controlling the pH value of the slurry during the water-washing treatment to 11.5, the slurry was subjected to filtration, and the resulting particles were subjected to additional washing treatment with water in an amount of 10 times the amount of the particles and further subjected to annealing treatment at 700° C. in an oxygen-containing atmosphere for 3 hr.

Comparative Example 5

The Li—Ni composite oxide particles obtained by the calcination in the same manner as in Example 1 were subjected to water-washing treatment. After controlling the pH value of the slurry during the water-washing treatment to 9.0, the slurry was subjected to filtration, and the resulting particles were subjected to additional washing treatment with water in an amount of 10 times the amount of the particles and then dried at 120° C. without subjected to annealing treatment.

Comparative Example 6

The Li—Ni composite oxide particles obtained by the calcination in the same manner as in Example 1 were subjected to water-washing treatment. After controlling the pH value of the slurry during the water-washing treatment to 9.0, the slurry was subjected to filtration, and the resulting particles were subjected to additional washing treatment with water in an amount of 10 times the amount of the particles and then dried at 120° C., and further subjected to annealing treatment at 300° C. in an oxygen-containing atmosphere for 3 hr.

Comparative Example 7

The Li—Ni composite oxide particles obtained by the calcination in the same manner as in Example 16 were subjected to no water-washing treatment. Further, 20 g of the resulting Li—Ni composite oxide particles were suspended in 100 mL of water for 10 min while stirring, and then a supernatant liquid was separated by filtration and subjected to titration to measure and evaluate contents of lithium hydroxide and lithium carbonate therein. As a result, it was confirmed that the supernatant liquid had a lithium hydroxide content of 0.38% by weight and a lithium carbonate content of 0.42% by weight. Also, it was confirmed that the cell produced using the Li—Ni composite oxide particles had a discharge capacity of 206 mA/g and a cycle characteristic of 97.2%, and the amount of gases generated therefrom was 1.55 mL/g as measured after storing the cell at 85° C. for 24 hr.

Comparative Example 8

The Li—Ni composite oxide particles obtained by the calcination in the same manner as in Example 16 were suspended in pure water and stirred for 10 min to subject the particles to water-washing treatment. The resulting suspension was subjected to filtration and then additional washing treatment without previously controlling the pH value of the slurry during the water-washing treatment. At this time, the pH value of the slurry was 12.41. Thereafter, the resulting particles were subjected to annealing treatment at 700° C. in an oxygen-containing atmosphere for 3 hr. As a result of ICP analysis, it was confirmed that the content of Al in the resulting Li—Ni composite oxide particles was Al/(Ni+Co+Mn+Al)=0.08 which showed an Al residual rate of 80.0%. Therefore, there was recognized such a tendency that the Al content in the Li—Ni composite oxide particles after the water-washing treatment was considerably reduced as compared to that before the water-washing treatment. Further, 20 g of the resulting Li—Ni composite oxide particles were suspended in 100 mL of water for 10 min while stirring, and then a supernatant liquid was separated by filtration and subjected to titration to measure and evaluate contents of lithium hydroxide and lithium carbonate therein. As a result, it was confirmed that the supernatant liquid had a lithium hydroxide content of 0.12% by weight and a lithium carbonate content of 0.10% by weight. Also, it was confirmed that the cell produced using the Li—Ni composite oxide particles had a discharge capacity of 202 mA/g and a capacity retention rate after 30 cycles of 90.2%, and the amount of gases generated therefrom was 0.23 mL/g as measured after storing the cell at 85° C. for 24 hr.

Comparative Example 9

The Li—Ni composite oxide particles obtained by the calcination in the same manner as in Example 25 were subjected to no water-washing treatment. Further, 20 g of the resulting Li—Ni composite oxide particles were suspended in 100 mL of water for 10 min while stirring, and then a supernatant liquid was separated by filtration and subjected to titration to measure and evaluate contents of lithium hydroxide and lithium carbonate therein. As a result, it was confirmed that the supernatant liquid had a lithium hydroxide content of 0.18% by weight and a lithium carbonate content of 0.19% by weight. Also, it was confirmed that the cell produced using the Li—Ni composite oxide particles had a discharge capacity of 178 mA/g and a cycle characteristic of 98.6%, and the amount of gases generated therefrom was 0.74 mL/g as measured after storing the cell at 85° C. for 24 hr.

Comparative Example 10

The Li—Ni composite oxide particles obtained by the calcination in the same manner as in Example 25 were suspended in pure water and stirred for 10 min to subject the particles to water-washing treatment. The resulting suspension was subjected to filtration and then additional washing treatment without previously controlling the pH value of the slurry during the water-washing treatment. At this time, the pH value of the slurry was 11.78. Thereafter, the resulting particles were subjected to annealing treatment at 700° C. in an oxygen-containing atmosphere for 3 hr. As a result of ICP analysis, it was confirmed that the content of Al in the resulting Li—Ni composite oxide particles was Al/(Ni+Co+Mn+Al)=0.007 which showed an Al residual rate of 70.0%. Therefore, there was recognized such a tendency that the Al content in the Li—Ni composite oxide particles after the water-washing treatment was considerably reduced as compared to that before the water-washing treatment. Further, 20 g of the resulting Li—Ni composite oxide particles were suspended in 100 mL of water for 10 min while stirring, and then a supernatant liquid was separated by filtration and subjected to titration to measure and evaluate contents of lithium hydroxide and lithium carbonate therein. As a result, it was confirmed that the supernatant liquid had a lithium hydroxide content of 0.05% by weight and a lithium carbonate content of 0.06% by weight. Also, it was confirmed that the cell produced using the Li—Ni composite oxide particles had a discharge capacity of 174 mA/g and a capacity retention rate after 30 cycles of 92.3%, and the amount of gases generated therefrom was 0.13 mL/g as measured after storing the cell at 85° C. for 24 hr.

The production conditions of the Li—Ni composite oxide particles in the respective Examples and Comparative Examples are shown in Table 1, and various properties of the resulting Li—Ni composite oxide particles are shown in Table 2.

TABLE 1

| | Composition before water-washing | Composition after water-washing |
|---|---|---|
| Examples | | |
| Example 1 | $Li_{1.02}Ni_{0.81}Co_{0.15}Al_{0.04}O_2$ | $Li_{0.99}Ni_{0.810}Co_{0.150}Al_{0.040}O_2$ |
| Example 2 | $Li_{1.02}Ni_{0.8060}Co_{0.1535}Al_{0.04}Bi_{0.0005}O_2$ | $Li_{1.00}Ni_{0.8060}Co_{0.1535}Al_{0.04}Bi_{0.0005}O_2$ |
| Example 3 | $Li_{1.02}Ni_{0.8060}Co_{0.1535}Al_{0.04}Bi_{0.00045}Sb_{0.00005}O_2$ | $Li_{0.99}Ni_{0.8060}Co_{0.1535}Al_{0.04}Bi_{0.00045}Sb_{0.00005}O_2$ |
| Example 4 | $Li_{1.02}Ni_{0.81}Co_{0.15}Al_{0.04}O_2$ | $Li_{0.98}Ni_{0.811}Co_{0.150}Al_{0.039}O_2$ |
| Example 5 | $Li_{1.02}Ni_{0.81}Co_{0.15}Al_{0.04}O_2$ | $Li_{0.99}Ni_{0.810}Co_{0.150}Al_{0.040}O_2$ |
| Example 6 | $Li_{1.02}Ni_{0.811}Co_{0.154}Al_{0.035}O_2$ | $Li_{0.97}Ni_{0.811}Co_{0.154}Al_{0.035}O_2$ |
| Example 7 | $Li_{1.02}Ni_{0.8}Co_{0.15}Al_{0.05}O_2$ | $Li_{0.99}Ni_{0.799}Co_{0.152}Al_{0.049}O_2$ |
| Example 8 | $Li_{1.02}Ni_{0.81}Co_{0.15}Al_{0.04}O_2$ | $Li_{0.98}Ni_{0.807}Co_{0.154}Al_{0.039}O_2$ |
| Example 9 | $Li_{1.02}Ni_{0.81}Co_{0.15}Al_{0.04}O_2$ | $Li_{0.99}Ni_{0.807}Co_{0.154}Al_{0.039}O_2$ |
| Example 10 | $Li_{1.02}Ni_{0.81}Co_{0.15}Al_{0.04}O_2$ | $Li_{1.00}Ni_{0.807}Co_{0.154}Al_{0.039}O_2$ |
| Example 11 | $Li_{1.02}Ni_{0.81}Co_{0.15}Al_{0.04}O_2$ | $Li_{0.98}Ni_{0.807}Co_{0.154}Al_{0.039}O_2$ |
| Example 12 | $Li_{1.02}Ni_{0.81}Co_{0.15}Al_{0.04}O_2$ | $Li_{0.99}Ni_{0.810}Co_{0.150}Al_{0.040}O_2$ |
| Example 13 | $Li_{1.02}Ni_{0.81}Co_{0.15}Al_{0.04}O_2$ | $Li_{0.99}Ni_{0.807}Co_{0.154}Al_{0.039}O_2$ |
| Example 14 | $Li_{1.02}Ni_{0.81}Co_{0.15}Al_{0.04}O_2$ | $Li_{0.98}Ni_{0.807}Co_{0.154}Al_{0.039}O_2$ |
| Example 15 | $Li_{1.02}Ni_{0.80}Co_{0.15}Al_{0.04}Zn_{0.01}O_2$ | $Li_{0.97}Ni_{0.799}Co_{0.152}Al_{0.039}Zn_{0.01}O_2$ |
| Example 16 | $Li_{1.04}Ni_{0.792}Co_{0.099}Mn_{0.099}Al_{0.01}O_2$ | $Li_{1.01}Ni_{0.792}Co_{0.099}Mn_{0.099}Al_{0.01}O_2$ |
| Example 17 | $Li_{1.04}Ni_{0.72}Co_{0.09}Mn_{0.09}Al_{0.1}O_2$ | $Li_{1.02}Ni_{0.72}Co_{0.09}Mn_{0.09}Al_{0.1}O_2$ |
| Example 18 | $Li_{1.04}Ni_{0.776}Co_{0.097}Mn_{0.097}Al_{0.01}Zr_{0.02}O_2$ | $Li_{1.01}Ni_{0.776}Co_{0.097}Mn_{0.097}Al_{0.01}Zr_{0.02}O_2$ |
| Example 19 | $Li_{1.04}Ni_{0.776}Co_{0.097}Mn_{0.097}Al_{0.01}Mg_{0.02}O_2$ | $Li_{1.01}Ni_{0.776}Co_{0.097}Mn_{0.097}Al_{0.01}Mg_{0.02}O_2$ |
| Example 20 | $Li_{1.04}Ni_{0.76}Co_{0.095}Mn_{0.095}Al_{0.05}O_2$ | $Li_{1.01}Ni_{0.76}Co_{0.095}Mn_{0.095}Al_{0.05}O_2$ |
| Example 21 | $Li_{1.04}Ni_{0.7916}Co_{0.09895}Mn_{0.09895}Al_{0.01}Bi_{0.0005}O_2$ | $Li_{1.02}Ni_{0.7916}Co_{0.09895}Mn_{0.09895}Al_{0.01}Bi_{0.0005}O_2$ |
| Example 22 | $Li_{1.04}Ni_{0.7916}Co_{0.09895}Mn_{0.09895}Al_{0.01}Bi_{0.00045}Sb_{0.00005}O_2$ | $Li_{1.02}Ni_{0.7916}Co_{0.09895}Mn_{0.09895}Al_{0.01}Bi_{0.00045}Sb_{0.00005}O_2$ |
| Example 23 | $Li_{1.04}Ni_{0.792}Co_{0.099}Mn_{0.099}Al_{0.01}O_2$ | $Li_{1.01}Ni_{0.7888}Co_{0.0986}Mn_{0.0986}Al_{0.014}O_2$ |
| Examples and Comparative Examples | | |
| Example 24 | $Li_{1.04}Ni_{0.792}Co_{0.099}Mn_{0.099}Al_{0.01}O_2$ | $Li_{1.01}Ni_{0.7888}Co_{0.0986}Mn_{0.0986}Al_{0.014}O_2$ |
| Example 25 | $Li_{1.04}Ni_{0.784}Co_{0.098}Mn_{0.098}Al_{0.01}Zn_{0.01}O_2$ | $Li_{1.01}Ni_{0.784}Co_{0.098}Mn_{0.098}Al_{0.01}Zn_{0.01}O_2$ |
| Example 26 | $Li_{1.04}Ni_{0.594}Co_{0.198}Mn_{0.198}Al_{0.01}O_2$ | $Li_{1.01}Ni_{0.594}Co_{0.198}Mn_{0.198}Al_{0.01}O_2$ |
| Example 27 | $Li_{1.04}Ni_{0.54}Co_{0.18}Mn_{0.18}Al_{0.1}O_2$ | $Li_{1.01}Ni_{0.54}Co_{0.18}Mn_{0.18}Al_{0.1}O_2$ |
| Example 28 | $Li_{1.04}Ni_{0.582}Co_{0.194}Mn_{0.194}Al_{0.01}Zr_{0.02}O_2$ | $Li_{1.01}Ni_{0.582}Co_{0.194}Mn_{0.194}Al_{0.01}Zr_{0.02}O_2$ |
| Example 29 | $Li_{1.04}Ni_{0.582}Co_{0.194}Mn_{0.194}Al_{0.01}Mg_{0.02}O_2$ | $Li_{1.01}Ni_{0.582}Co_{0.194}Mn_{0.194}Al_{0.01}Mg_{0.02}O_2$ |
| Example 30 | $Li_{1.04}Ni_{0.57}Co_{0.19}Mn_{0.19}Al_{0.05}O_2$ | $Li_{1.01}Ni_{0.57}Co_{0.19}Mn_{0.19}Al_{0.05}O_2$ |
| Example 31 | $Li_{1.04}Ni_{0.5937}Co_{0.1979}Mn_{0.1979}Al_{0.01}Bi_{0.0005}O_2$ | $Li_{1.02}Ni_{0.5937}Co_{0.1979}Mn_{0.1979}Al_{0.01}Bi_{0.0005}O_2$ |
| Example 32 | $Li_{1.04}Ni_{0.5937}Co_{0.1979}Mn_{0.1979}Al_{0.01}Bi_{0.00045}Sb_{0.00005}O_2$ | $Li_{1.02}Ni_{0.5937}Co_{0.1979}Mn_{0.1979}Al_{0.01}Bi_{0.00045}Sb_{0.00005}O_2$ |
| Example 33 | $Li_{1.04}Ni_{0.588}Co_{0.196}Mn_{0.196}Al_{0.01}Zn_{0.01}O_2$ | $Li_{1.00}Ni_{0.588}Co_{0.196}Mn_{0.196}Al_{0.01}Zn_{0.01}O_2$ |
| Comparative Example 1 | $Li_{1.02}Ni_{0.81}Co_{0.15}Al_{0.04}O_2$ | — |
| Comparative Example 2 | $Li_{1.02}Ni_{0.81}Co_{0.15}Al_{0.04}O_2$ | $Li_{0.97}Ni_{0.811}Co_{0.154}Al_{0.035}O_2$ |
| Comparative Example 3 | $Li_{1.02}Ni_{0.81}Co_{0.15}Al_{0.04}O_2$ | $Li_{0.98}Ni_{0.811}Co_{0.155}Al_{0.034}O_2$ |
| Comparative Example 4 | $Li_{1.02}Ni_{0.81}Co_{0.15}Al_{0.04}O_2$ | $Li_{0.98}Ni_{0.8159}Co_{0.1511}Al_{0.033}O_2$ |
| Comparative Example 5 | $Li_{1.02}Ni_{0.81}Co_{0.15}Al_{0.04}O_2$ | $Li_{0.99}Ni_{0.810}Co_{0.150}Al_{0.040}O_2$ |

TABLE 1-continued

| | | | |
|---|---|---|---|
| Comparative Example 6 | $Li_{1.02}Ni_{0.81}Co_{0.15}Al_{0.04}O_2$ | | $Li_{0.97}Ni_{0.807}Co_{0.154}Al_{0.039}O_2$ |
| Comparative Example 7 | $Li_{1.04}Ni_{0.792}Co_{0.099}Mn_{0.099}Al_{0.01}O_2$ | | — |
| Comparative Example 8 | $Li_{1.04}Ni_{0.792}Co_{0.099}Mn_{0.099}Al_{0.01}O_2$ | | $Li_{1.00}Ni_{0.7938}Co_{0.0992}Mn_{0.0992}Al_{0.0078}O_2$ |
| Comparative Example 9 | $Li_{1.04}Ni_{0.594}Co_{0.198}Mn_{0.198}Al_{0.01}O_2$ | | — |
| Comparative Example 10 | $Li_{1.04}Ni_{0.594}Co_{0.198}Mn_{0.198}Al_{0.01}O_2$ | | $Li_{0.99}Ni_{0.5954}Co_{0.1985}Mn_{0.1985}Al_{0.0076}O_2$ |

| | Water-washing treatment | | | |
|---|---|---|---|---|
| | Amount treated (kg) | Amount of water (L) | Water temp. (° C.) | pH-Control time (min) |
| Examples | | | | |
| Example 1 | 1.5 | 7.5 | 15 | 9 |
| Example 2 | 1.5 | 7.5 | 15 | 9 |
| Example 3 | 1.5 | 7.5 | 15 | 9 |
| Example 4 | 1.5 | 7.5 | 15 | 9 |
| Example 5 | 1.5 | 7.5 | 15 | 9 |
| Example 6 | 1.5 | 7.5 | 15 | 9 |
| Example 7 | 1.5 | 7.5 | 15 | 9 |
| Example 8 | 1.5 | 7.5 | 15 | 9 |
| Example 9 | 1.5 | 7.5 | 15 | 9 |
| Example 10 | 1.5 | 7.5 | 15 | 9 |
| Example 11 | 1.5 | 7.5 | 15 | 9 |
| Example 12 | 1.5 | 7.5 | 15 | 9 |
| Example 13 | 1.5 | 7.5 | 15 | 9 |
| Example 14 | 1.5 | 7.5 | 15 | 9 |
| Example 15 | 1.5 | 7.5 | 15 | 9 |
| Example 16 | 1.5 | 7.5 | 15 | 9 |
| Example 17 | 1.5 | 7.5 | 15 | 9 |
| Example 18 | 1.5 | 7.5 | 15 | 9 |
| Example 19 | 1.5 | 7.5 | 15 | 9 |
| Example 20 | 1.5 | 7.5 | 15 | 9 |
| Example 21 | 1.5 | 7.5 | 15 | 9 |
| Example 22 | 1.5 | 7.5 | 15 | 9 |
| Example 23 | 1.5 | 7.5 | 15 | 9 |
| Examples and Comparative Examples | | | | |
| Example 24 | 1.5 | 7.5 | 15 | 9 |
| Example 25 | 1.5 | 7.5 | 15 | 9 |
| Example 26 | 1.5 | 7.5 | 15 | 9 |
| Example 27 | 1.5 | 7.5 | 15 | 9 |
| Example 28 | 1.5 | 7.5 | 15 | 9 |
| Example 29 | 1.5 | 7.5 | 15 | 9 |
| Example 30 | 1.5 | 7.5 | 15 | 9 |
| Example 31 | 1.5 | 7.5 | 15 | 9 |
| Example 32 | 1.5 | 7.5 | 15 | 9 |
| Example 33 | 1.5 | 7.5 | 15 | 9 |
| Comparative Example 1 | — | — | — | — |
| Comparative Example 2 | 1.5 | 7.5 | 15 | (10) |
| Comparative Example 3 | 1.5 | 7.5 | 15 | 9 |
| Comparative Example 4 | 1.5 | 7.5 | 15 | 9 |
| Comparative Example 5 | 1.5 | 7.5 | 15 | 9 |
| Comparative Example 6 | 1.5 | 7.5 | 15 | 9 |
| Comparative Example 7 | — | — | — | — |
| Comparative Example 8 | 1.5 | 7.5 | 15 | 9 |
| Comparative Example 9 | — | — | — | — |
| Comparative Example 10 | 1.5 | 7.5 | 15 | 9 |

TABLE 1-continued

|  | Water-washing treatment | | |
|---|---|---|---|
|  | Treating species (—) | pH (—) | Additional washing (L) |
| Examples | | | |
| Example 1 | $H_2SO_4$ | 9.00 | 15 |
| Example 2 | $H_2SO_4$ | 9.00 | 15 |
| Example 3 | $H_2SO_4$ | 9.00 | 15 |
| Example 4 | $H_2SO_4$ | 6.50 | 15 |
| Example 5 | $H_2SO_4$ | 10.50 | 15 |
| Example 6 | $H_2SO_4$ | 9.00 | 15 |
| Example 7 | $H_2SO_4$ | 9.00 | 15 |
| Example 8 | $H_3PO_4$ | 9.00 | 15 |
| Example 9 | $CoSO_4 \cdot 7H_2O$ | 9.00 | 15 |
| Example 10 | $CH_3COOH$ | 9.00 | 15 |
| Example 11 | $H_2SO_4$ | 9.00 | 15 |
| Example 12 | $H_2SO_4$ | 9.00 | 15 |
| Example 13 | $H_2SO_4$ | 9.00 | 15 |
| Example 14 | $H_2SO_4$ | 9.00 | 15 |
| Example 15 | $H_2SO_4$ | 9.00 | 15 |
| Example 16 | $H_2SO_4$ | 9.00 | 15 |
| Example 17 | $H_2SO_4$ | 9.00 | 15 |
| Example 18 | $H_2SO_4$ | 9.00 | 15 |
| Example 19 | $H_2SO_4$ | 9.00 | 15 |
| Example 20 | $H_2SO_4$ | 9.00 | 15 |
| Example 21 | $H_2SO_4$ | 9.00 | 15 |
| Example 22 | $H_2SO_4$ | 9.00 | 15 |
| Example 23 | $NaAlO_2 + H_2SO_4$ | 9.00 | 15 |
| Examples and Comparative Example | | | |
| Example 24 | $Al_2(SO_4)_3 \cdot 18H_2O + H_2SO_4$ | 9.00 | 15 |
| Example 25 | $H_2SO_4$ | 9.00 | 15 |
| Example 26 | $H_2SO_4$ | 9.00 | 15 |
| Example 27 | $H_2SO_4$ | 9.00 | 15 |
| Example 28 | $H_2SO_4$ | 9.00 | 15 |
| Example 29 | $H_2SO_4$ | 9.00 | 15 |
| Example 30 | $H_2SO_4$ | 9.00 | 15 |
| Example 31 | $H_2SO_4$ | 9.00 | 15 |
| Example 32 | $H_2SO_4$ | 9.00 | 15 |
| Example 33 | $H_2SO_4$ | 9.00 | 15 |
| Comparative Example 1 | — | — | — |
| Comparative Example 2 | — | 12.60 | 15 |
| Comparative Example 3 | $H_2SO_4$ | 3.00 | 15 |
| Comparative Example 4 | $H_2SO_4$ | 11.50 | 15 |
| Comparative Example 5 | $H_2SO_4$ | 9.00 | 15 |
| Comparative Example 6 | $H_2SO_4$ | 9.00 | 15 |
| Comparative Example 7 | — | — | 15 |
| Comparative Example 8 | — | — | 15 |
| Comparative Example 9 | — | — | 15 |
| Comparative Example 10 | — | — | 15 |

|  | Drying | Annealing treatment | | |
|---|---|---|---|---|
|  | Temp. (° C.) | Atmosphere (—) | Temp. (° C.) | Time (hr) |
| Examples | | | | |
| Example 1 | 120 | $O_2$ | 700 | 3 |
| Example 2 | 120 | $O_2$ | 700 | 3 |
| Example 3 | 120 | $O_2$ | 700 | 3 |
| Example 4 | 120 | $O_2$ | 700 | 3 |
| Example 5 | 120 | $O_2$ | 700 | 3 |
| Example 6 | 120 | $O_2$ | 700 | 3 |

TABLE 1-continued

| | | | | |
|---|---|---|---|---|
| Example 7 | 120 | O$_2$ | 700 | 3 |
| Example 8 | 120 | O$_2$ | 700 | 3 |
| Example 9 | 120 | O$_2$ | 700 | 3 |
| Example 10 | 120 | O$_2$ | 700 | 3 |
| Example 11 | 120 | O$_2$ | 700 | 3 |
| Example 12 | 120 | O$_2$ | 700 | 3 |
| Example 13 | 120 | O$_2$ | 500 | 3 |
| Example 14 | 120 | O$_2$ | 600 | 3 |
| Example 15 | 120 | O$_2$ | 700 | 3 |
| Example 16 | 120 | O$_2$ | 700 | 3 |
| Example 17 | 120 | O$_2$ | 700 | 3 |
| Example 18 | 120 | O$_2$ | 700 | 3 |
| Example 19 | 120 | O$_2$ | 700 | 3 |
| Example 20 | 120 | O$_2$ | 700 | 3 |
| Example 21 | 120 | O$_2$ | 700 | 3 |
| Example 22 | 120 | O$_2$ | 700 | 3 |
| Example 23 | 120 | O$_2$ | 700 | 3 |
| Examples and Comparative Examples | | | | |
| Example 24 | 120 | O$_2$ | 700 | 3 |
| Example 25 | 120 | O$_2$ | 700 | 3 |
| Example 26 | 120 | O$_2$ | 700 | 3 |
| Example 27 | 120 | O$_2$ | 700 | 3 |
| Example 28 | 120 | O$_2$ | 700 | 3 |
| Example 29 | 120 | O$_2$ | 700 | 3 |
| Example 30 | 120 | O$_2$ | 700 | 3 |
| Example 31 | 120 | O$_2$ | 700 | 3 |
| Example 32 | 120 | O$_2$ | 700 | 3 |
| Example 33 | 120 | O$_2$ | 700 | 3 |
| Comparative Example 1 | — | — | — | — |
| Comparative Example 2 | 120 | O$_2$ | 700 | 3 |
| Comparative Example 3 | 120 | O$_2$ | 700 | 3 |
| Comparative Example 4 | 120 | O$_2$ | 700 | 3 |
| Comparative Example 5 | 120 | — | — | — |
| Comparative Example 6 | 120 | O$_2$ | 300 | 3 |
| Comparative Example 7 | — | — | — | — |
| Comparative Example 8 | 120 | O$_2$ | 700 | 3 |
| Comparative Example 9 | — | — | — | — |
| Comparative Example 10 | 120 | O$_2$ | 700 | 3 |

TABLE 2

| | Li/Me after treatment (—) | Residual rate of amphoteric metal (%) | STEM-EDX Ma (0 nm) (atom %) | STEM-EDX Ma (50 nm) (atom %) |
|---|---|---|---|---|
| Examples | | | | |
| Example 1 | 0.99 | 100.0 | 43.3 | 1.2 |
| Example 2 | 1.00 | 100.0 | 41.1 | 1.5 |
| Example 3 | 0.99 | 100.0 | 43.0 | 3.2 |
| Example 4 | 0.98 | 97.5 | 47.6 | 1.2 |
| Example 5 | 0.99 | 100.0 | 41.3 | 2.0 |
| Example 6 | 0.97 | 100.0 | 36.7 | 2.3 |
| Example 7 | 0.99 | 98.0 | 54.0 | 0.9 |
| Example 8 | 0.98 | 97.5 | 43.9 | 3.2 |
| Example 9 | 0.99 | 97.5 | 19.2 | 2.6 |
| Example 10 | 1.00 | 97.5 | 41.8 | 0.8 |
| Example 11 | 0.98 | 97.5 | 45.7 | 2.7 |
| Example 12 | 0.99 | 100.0 | 43.8 | 2.0 |
| Example 13 | 0.99 | 97.5 | 43.2 | 2.8 |
| Example 14 | 0.98 | 97.5 | 46.0 | 1.7 |
| Example 15 | 0.97 | 98.0 | 40.1 | 2.3 |
| Example 16 | 1.01 | 100.0 | 40.5 | 1.3 |
| Example 17 | 1.02 | 100.0 | 62.5 | 5.5 |
| Example 18 | 1.00 | 100.0 | 48.0 | 3.8 |
| Example 19 | 1.02 | 100.0 | 58.9 | 4.3 |
| Example 20 | 1.02 | 100.0 | 59.2 | 4.5 |
| Example 21 | 1.01 | 100.0 | 42.0 | 3.2 |
| Example 22 | 1.02 | 100.0 | 41.5 | 3.1 |
| Example 23 | 1.01 | 140.0 | 70.3 | 1.4 |
| Examples and Comparative Examples | | | | |
| Example 24 | 1.01 | 140.0 | 70.5 | 1.8 |
| Example 25 | 1.01 | 100.0 | 42.0 | 2.8 |
| Example 26 | 1.01 | 100.0 | 42.3 | 1.3 |
| Example 27 | 1.00 | 100.0 | 60.6 | 5.9 |
| Example 28 | 1.01 | 100.0 | 45.9 | 3.3 |
| Example 29 | 1.01 | 100.0 | 45.1 | 3.2 |
| Example 30 | 1.01 | 100.0 | 57.9 | 4.2 |
| Example 31 | 1.02 | 100.0 | 45.9 | 1.5 |
| Example 32 | 1.02 | 100.0 | 44.0 | 1.8 |
| Example 33 | 1.00 | 100.0 | 42.0 | 1.3 |

TABLE 2-continued

| | | | | |
|---|---|---|---|---|
| Comparative Example 1 | 1.02 | 100.0 | 1.0 | 1.0 |
| Comparative Example 2 | 0.97 | 87.5 | 2.5 | 3.1 |
| Comparative Example 3 | 0.96 | 85.0 | 2.1 | 3.4 |
| Comparative Example 4 | 0.98 | 82.5 | 1.9 | 2.7 |
| Comparative Example 5 | 0.99 | 100.0 | 41.5 | 1.5 |
| Comparative Example 6 | 0.97 | 97.5 | 42.3 | 1.9 |
| Comparative Example 7 | 1.04 | 100.0 | 1.0 | 1.3 |
| Comparative Example 8 | 1.00 | 78.0 | 2.6 | 2.3 |
| Comparative Example 9 | 1.04 | 100.0 | 1.5 | 1.5 |
| Comparative Example 10 | 1.01 | 76.0 | 2.7 | 2.6 |

| | STEM-EDX | | | |
|---|---|---|---|---|
| | Ni (0 nm) (atom %) | Co (0 nm) (atom %) | Ma/Ni (0 nm) (—) | D50 (μm) |
| Examples | | | | |
| Example 1 | 10.4 | 3.0 | 4.2 | 12.7 |
| Example 2 | 13.0 | 3.9 | 3.2 | 14.0 |
| Example 3 | 11.1 | 4.9 | 3.9 | 13.9 |
| Example 4 | 13.4 | 2.8 | 3.6 | 12.8 |
| Example 5 | 12.0 | 3.1 | 3.4 | 13.1 |
| Example 6 | 14.7 | 5.2 | 2.5 | 12.8 |
| Example 7 | 11.9 | 4.0 | 4.5 | 14.4 |
| Example 8 | 12.5 | 5.1 | 3.5 | 12.9 |
| Example 9 | 4.4 | 51.0 | 4.4 | 13.0 |
| Example 10 | 9.0 | 2.9 | 4.6 | 12.5 |
| Example 11 | 11.2 | 2.9 | 4.1 | 6.4 |
| Example 12 | 13.4 | 4.6 | 3.3 | 23.2 |
| Example 13 | 12.7 | 5.2 | 3.4 | 13.3 |
| Example 14 | 13.8 | 3.0 | 3.3 | 13.1 |
| Example 15 | 12.4 | 3.1 | 3.2 | 13.9 |
| Example 16 | 10.8 | 3.3 | 3.8 | 9.9 |
| Example 17 | 11.1 | 3.4 | 5.6 | 10.0 |
| Example 18 | 12.3 | 3.9 | 3.9 | 10.2 |
| Example 19 | 13.9 | 5.0 | 4.2 | 9.7 |
| Example 20 | 14.2 | 5.1 | 4.2 | 9.5 |
| Example 21 | 10.5 | 6.2 | 4.0 | 9.5 |
| Example 22 | 9.8 | 4.8 | 4.2 | 9.9 |
| Example 23 | 12.1 | 3.8 | 5.8 | 9.8 |
| Examples and Comparative Examples | | | | |
| Example 24 | 11.9 | 4.1 | 5.9 | 10.0 |
| Example 25 | 11.1 | 5.2 | 3.8 | 10.1 |
| Example 26 | 10.8 | 6.0 | 3.9 | 9.8 |
| Example 27 | 10.9 | 5.5 | 5.6 | 10.0 |
| Example 28 | 13.9 | 5.2 | 3.3 | 10.6 |
| Example 29 | 13.2 | 5.0 | 3.4 | 10.4 |
| Example 30 | 12.9 | 4.9 | 4.5 | 10.2 |
| Example 31 | 11.8 | 5.0 | 3.9 | 9.9 |
| Example 32 | 12.4 | 5.5 | 3.5 | 10.0 |
| Example 33 | 12.9 | 5.4 | 3.3 | 9.9 |
| Comparative Example 1 | 45.0 | 7.8 | 0.0 | 13.1 |
| Comparative Example 2 | 29.7 | 6.7 | 0.1 | 12.8 |
| Comparative Example 3 | 42.8 | 8.7 | 0.0 | 13.0 |
| Comparative Example 4 | 43.9 | 8.1 | 0.0 | 12.7 |
| Comparative Example 5 | 18.0 | 6.0 | 2.3 | 12.6 |
| Comparative Example 6 | 16.1 | 5.2 | 2.6 | 13.2 |
| Comparative Example 7 | 44.0 | 7.6 | 0.0 | 10.2 |
| Comparative Example 8 | 27.8 | 6.9 | 0.1 | 10.5 |
| Comparative Example 9 | 58.2 | 8.1 | 0.0 | 9.9 |
| Comparative Example 10 | 42.1 | 7.1 | 0.1 | 9.7 |

| | | Content of surplus lithium | |
|---|---|---|---|
| | BET (m$^2$/g) | LiOH (wt %) | Li$_2$CO$_3$ (wt %) |
| Examples | | | |
| Example 1 | 0.14 | 0.12 | 0.07 |
| Example 2 | 0.12 | 0.13 | 0.12 |
| Example 3 | 0.17 | 0.12 | 0.07 |
| Example 4 | 0.16 | 0.13 | 0.05 |
| Example 5 | 0.20 | 0.12 | 0.06 |
| Example 6 | 0.19 | 0.14 | 0.07 |
| Example 7 | 0.13 | 0.10 | 0.04 |
| Example 8 | 0.19 | 0.08 | 0.04 |
| Example 9 | 0.24 | 0.14 | 0.06 |
| Example 10 | 0.16 | 0.15 | 0.07 |
| Example 11 | 0.39 | 0.11 | 0.10 |
| Example 12 | 0.09 | 0.15 | 0.10 |
| Example 13 | 0.75 | 0.10 | 0.13 |
| Example 14 | 0.45 | 0.12 | 0.09 |
| Example 15 | 0.15 | 0.14 | 0.10 |
| Example 16 | 0.22 | 0.12 | 0.04 |
| Example 17 | 0.23 | 0.11 | 0.06 |
| Example 18 | 0.23 | 0.10 | 0.03 |
| Example 19 | 0.24 | 0.09 | 0.04 |
| Example 20 | 0.25 | 0.08 | 0.04 |
| Example 21 | 0.26 | 0.14 | 0.05 |
| Example 22 | 0.22 | 0.16 | 0.05 |
| Example 23 | 0.24 | 0.16 | 0.07 |
| Examples and Comparative Examples | | | |
| Example 24 | 0.25 | 0.18 | 0.08 |
| Example 25 | 0.28 | 0.11 | 0.06 |
| Example 26 | 0.22 | 0.14 | 0.08 |
| Example 27 | 0.26 | 0.07 | 0.05 |
| Example 28 | 0.22 | 0.06 | 0.04 |
| Example 29 | 0.23 | 0.07 | 0.05 |
| Example 30 | 0.25 | 0.08 | 0.06 |
| Example 31 | 0.23 | 0.06 | 0.07 |
| Example 32 | 0.28 | 0.05 | 0.05 |
| Example 33 | 0.25 | 0.06 | 0.06 |
| Comparative Example 1 | 0.15 | 0.46 | 0.40 |
| Comparative Example 2 | 0.13 | 0.14 | 0.06 |
| Comparative Example 3 | 0.16 | 0.13 | 0.08 |
| Comparative Example 4 | 0.15 | 0.12 | 0.07 |
| Comparative Example 5 | 1.85 | 0.05 | 0.32 |
| Comparative Example 6 | 1.57 | 0.04 | 0.14 |
| Comparative Example 7 | 0.24 | 0.38 | 0.42 |
| Comparative Example 8 | 0.25 | 0.12 | 0.10 |

TABLE 2-continued

| | pH (—) | Sulfur content (ppm) | Sodium content (ppm) |
|---|---|---|---|
| Comparative Example 9 | 0.27 | 0.18 | 0.19 |
| Comparative Example 10 | 0.26 | 0.05 | 0.06 |
| Examples | | | |
| Example 1 | 10.77 | 18 | <5 |
| Example 2 | 10.75 | 16 | <5 |
| Example 3 | 10.92 | 26 | <5 |
| Example 4 | 10.82 | 18 | <5 |
| Example 5 | 10.77 | 21 | <5 |
| Example 6 | 10.73 | 17 | <5 |
| Example 7 | 10.79 | 23 | <5 |
| Example 8 | 10.71 | 7 | <5 |
| Example 9 | 10.69 | 20 | <5 |
| Example 10 | 10.83 | 8 | <5 |
| Example 11 | 10.84 | 13 | <5 |
| Example 12 | 10.67 | 27 | <5 |
| Example 13 | 10.55 | 15 | <5 |
| Example 14 | 10.65 | 23 | <5 |
| Example 15 | 10.88 | 14 | <5 |
| Example 16 | 10.68 | 19 | <5 |
| Example 17 | 10.69 | 17 | <5 |
| Example 18 | 10.71 | 20 | <5 |
| Example 19 | 10.74 | 21 | <5 |
| Example 20 | 10.73 | 22 | <5 |
| Example 21 | 10.69 | 24 | <5 |
| Example 22 | 10.75 | 19 | <5 |
| Example 23 | 10.76 | 19 | <5 |
| Examples and Comparative Examples | | | |
| Example 24 | 10.79 | 18 | <5 |
| Example 25 | 10.80 | 23 | <5 |
| Example 26 | 10.45 | 24 | <5 |
| Example 27 | 10.49 | 25 | <5 |
| Example 28 | 10.38 | 20 | <5 |
| Example 29 | 10.41 | 22 | <5 |
| Example 30 | 10.39 | 19 | <5 |
| Example 31 | 10.42 | 16 | <5 |
| Example 32 | 10.44 | 13 | <5 |
| Example 33 | 10.50 | 11 | <5 |
| Comparative Example 1 | 11.42 | 583 | 240 |
| Comparative Example 2 | 10.74 | 9 | <5 |
| Comparative Example 3 | 10.68 | 50 | <5 |
| Comparative Example 4 | 10.74 | 10 | <5 |
| Comparative Example 5 | 10.40 | 87 | <5 |
| Comparative Example 6 | 10.50 | 19 | <5 |
| Comparative Example 7 | 11.40 | 456 | 228 |
| Comparative Example 8 | 11.02 | 7 | <5 |
| Comparative Example 9 | 11.35 | 706 | 256 |
| Comparative Example 10 | 10.80 | 9 | <5 |

| | Battery characteristics | | |
|---|---|---|---|
| | Discharge capacity (mAh/g) | Capacity retention rate after 30 cycles (%) | Amount of gases generated (mL/g) |
| Examples | | | |
| Example 1 | 187 | 95.7 | 0.19 |
| Example 2 | 190 | 95.8 | 0.18 |
| Example 3 | 196 | 95.2 | 0.20 |
| Example 4 | 186 | 95.3 | 0.21 |
| Example 5 | 189 | 95.6 | 0.22 |
| Example 6 | 194 | 95.3 | 0.26 |
| Example 7 | 186 | 97.1 | 0.17 |
| Example 8 | 194 | 95.7 | 0.22 |
| Example 9 | 189 | 95.8 | 0.22 |
| Example 10 | 188 | 95.9 | 0.25 |
| Example 11 | 185 | 97.0 | 0.31 |
| Example 12 | 198 | 95.2 | 0.16 |
| Example 13 | 187 | 95.5 | 0.27 |
| Example 14 | 187 | 96.5 | 0.23 |
| Example 15 | 193 | 96.7 | 0.38 |
| Example 16 | 204 | 95.3 | 0.17 |
| Example 17 | 185 | 97.6 | 0.18 |
| Example 18 | 202 | 95.1 | 0.18 |
| Example 19 | 195 | 97.2 | 0.16 |
| Example 20 | 194 | 96.5 | 0.15 |
| Example 21 | 203 | 95.5 | 0.17 |
| Example 22 | 204 | 95.1 | 0.19 |
| Example 23 | 202 | 95.9 | 0.19 |
| Examples and Comparative Examples | | | |
| Example 24 | 201 | 96.1 | 0.18 |
| Example 25 | 203 | 95.3 | 0.16 |
| Example 26 | 179 | 95.9 | 0.11 |
| Example 27 | 160 | 97.0 | 0.11 |
| Example 28 | 178 | 95.8 | 0.10 |
| Example 29 | 177 | 96.1 | 0.11 |
| Example 30 | 172 | 96.9 | 0.13 |
| Example 31 | 177 | 95.8 | 0.12 |
| Example 32 | 176 | 95.7 | 0.11 |
| Example 33 | 177 | 95.5 | 0.10 |
| Comparative Example 1 | 192 | 97.5 | 1.88 |
| Comparative Example 2 | 189 | 91.1 | 0.39 |
| Comparative Example 3 | 188 | 90.3 | 0.38 |
| Comparative Example 4 | 191 | 90.0 | 0.40 |
| Comparative Example 5 | 192 | 96.0 | 0.50 |
| Comparative Example 6 | 197 | 93.6 | 0.46 |
| Comparative Example 7 | 206 | 97.2 | 1.55 |
| Comparative Example 8 | 202 | 90.2 | 0.23 |
| Comparative Example 9 | 178 | 98.6 | 0.74 |
| Comparative Example 10 | 174 | 94.3 | 0.13 |

Figure 2:
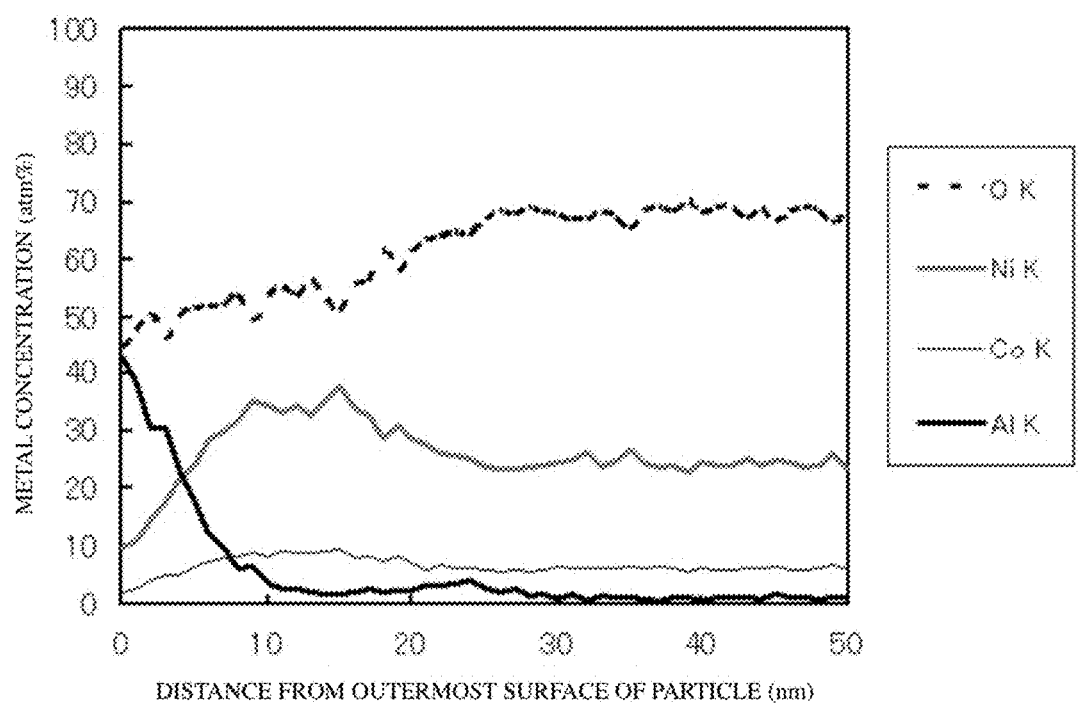
FIG. 2 is a graph showing the measurement results of metal concentrations of Ni, Co and Al on a section of the Li—Ni composite oxide particles obtained in Example 1 as observed by STEM-EDX, in which the metal concentrations were measured in a region from an outermost surface of the respective Li—Ni composite oxide particles to a position spaced by 50 nm from the outermost surface toward a center thereof.
Figure 3:
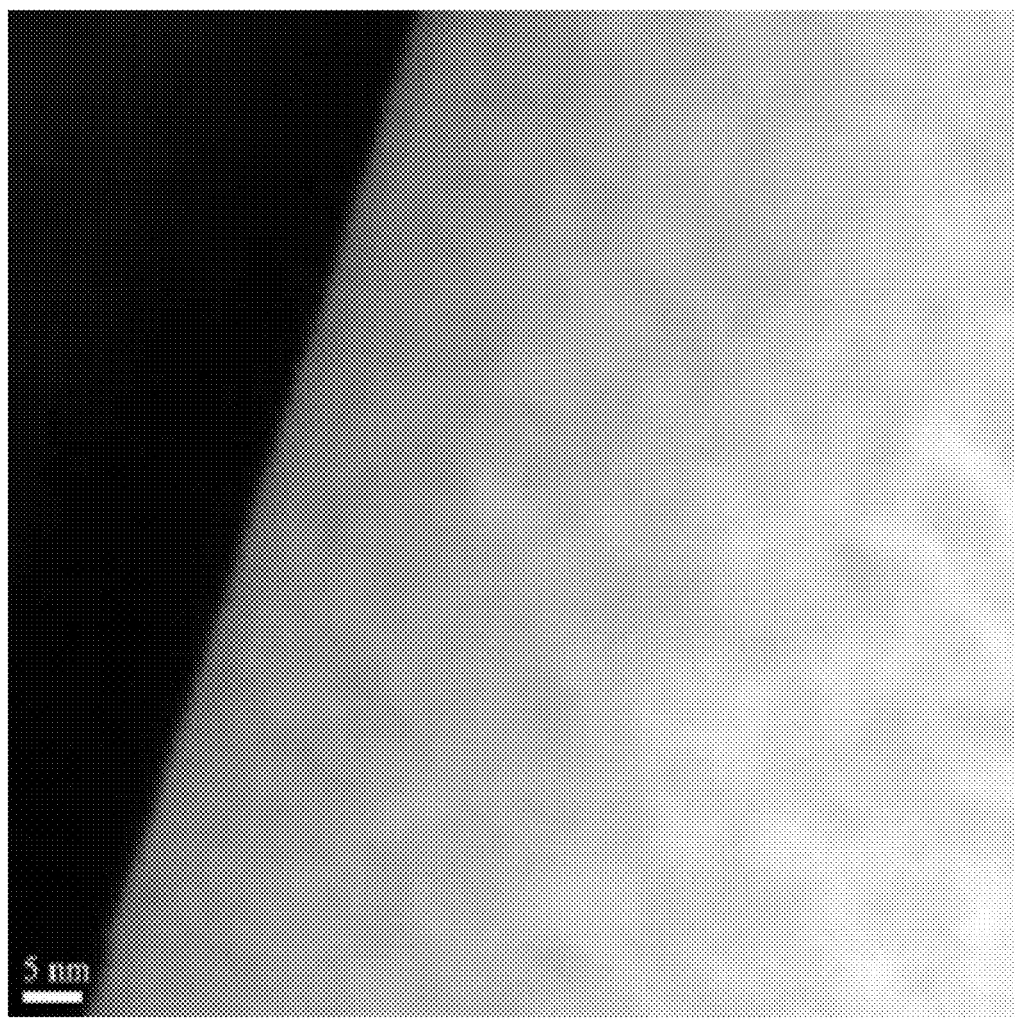
FIG. 3 is an micrographic image of a section of the Li—Ni composite oxide particles obtained in Comparative Example 2 as observed by STEM-EDX.
Figure 4:
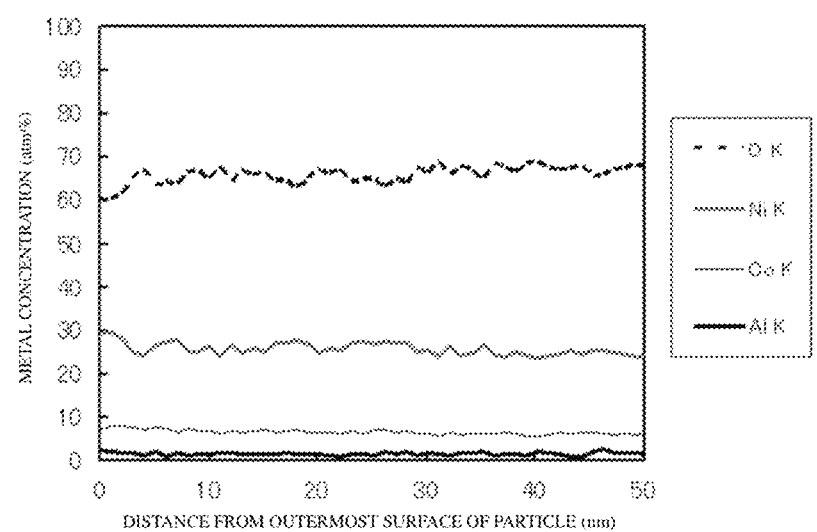
FIG. 4 is a graph showing the measurement results of metal concentrations of Ni, Co and Al on a section of the Li—Ni composite oxide particles obtained in Comparative Example 2 as observed by STEM-EDX, in which the metal concentrations were measured in a region from an outermost surface of the respective Li—Ni composite oxide particles to a position spaced by 50 nm from the outermost surface toward a center thereof.

The obtained Li—Ni composite oxide particles (Example 1 and Comparative Example 2) were cut to measure a metal concentration on a cut section of the particles by STEM-EDX. In the case where the pH value of the slurry was not controlled (Comparative Example 2), there occurred no change in the metal concentration on the surface of the respective particles depending upon a distance from the outermost surface thereof upon being subjected to the water-washing treatment, as shown in FIG. 4. On the other hand, in the case where the pH value of the slurry was controlled, the metal concentration on the surface of the respective particles was increased as shown in FIG. 2. In addition, from the micrographic image as shown in FIG. 1, formation of the layer having a high Al concentration on the outermost surface of the respective particles was recognized, whereas from the micrographic image as shown in FIG. 3 in which the pH value of the slurry was not controlled, no formation of a coating layer on the outermost surface of the respective particles was recognized.

In the Li—Ni composite oxide particles obtained in Examples 1 to 33 in which the pH value of the slurry was controlled upon the water-washing treatment, the layer having a high amphoteric metal concentration was formed on the surface of the respective particles while maintaining a suitable content of the amphoteric metal therein, thereby attaining a stable crystal structure of the particles. As a result, the Li—Ni composite oxide particles serve as an excellent positive electrode material having improved cycle characteristics when used in a secondary battery.

Also, when 20 g of the Li—Ni composite oxide particles according to the present invention were suspended in 100 mL of water for 10 min while stirring, the contents of lithium hydroxide and lithium carbonate in a supernatant liquid separated from the slurry were not more than 0.25% by weight and not more than 0.20% by weight, respectively. Therefore, the Li—Ni composite oxide particles according to the present invention provides an excellent positive electrode material capable of suppressing a decomposition reaction of an electrolyte solution by alkali components under high-temperature environmental conditions and being improved in generation of gases therefrom.

Further, in the non-aqueous electrolyte secondary battery using the Li—Ni composite oxide particles as a positive electrode active substance, the amount of gases generated therefrom after storing the battery at 85° C. for 24 hr was not more than 0.45 mL/g. Therefore, it is believed that the Li—Ni composite oxide particles provides an excellent positive electrode material capable of suppressing a reactivity with an electrolyte solution under high-temperature environmental conditions and being improved in generation of gases therefrom.

From the above results, the Li—Ni composite oxide particles according to the present invention have a less amount of gases generated therefrom and can exhibit excellent charge/discharge characteristics under high-temperature conditions when used in a secondary battery. Therefore, it is recognized that the Li—Ni composite oxide particles are effective as a positive electrode active substance for non-aqueous electrolyte secondary batteries.

INDUSTRIAL APPLICABILITY

The Li—Ni composite oxide particles according to the present invention are Li—Ni composite oxide particles which are obtained by dispersing the particles in water in the water-washing treatment to prepare a slurry thereof and then controlling a pH value of the slurry to 5.0 to 11.0, and provided on the surface thereof with a layer having a high amphoteric metal concentration while maintaining a suitable amphoteric metal concentration in the particles. Therefore, the Li—Ni composite oxide particles can provide a non-aqueous electrolyte secondary battery having excellent cycle characteristics and excellent charge/discharge characteristics under high-temperature conditions with a less amount of gases generated therefrom.

The invention claimed is:
1. A process for producing Li—Ni composite oxide particles having a composition represented by the formula:

$$Li_x(Ni_{1-y-w-z-v}Co_yMn_wMa_zMb_v)O_2$$

wherein $0.9 \leq x \leq 1.1$; $0.05 \leq y \leq 0.25$; $0 \leq w \leq 0.25$; $0 < z \leq 0.15$; $0 \leq v \leq 0.03$; Ma is at least one amphoteric metal selected from the group consisting of Al, Zn and Sn; and Mb is at least one metal selected from the group consisting of Bi, Sb, Zr, B and Mg, wherein the Li—Ni composite oxide particles have a BET specific surface area of 0.05 to 0.8 m²/g; an atomic ratio (Ma/Ni) of a concentration of the amphoteric metal to a concentration of Ni on an outermost surface of the respective Li—Ni composite oxide particles is 2 to 6; and the concentration of the amphoteric metal on the outermost surface of the respective Li—Ni composite oxide particles is higher than a concentration of the amphoteric metal at a position spaced by 50 nm from the outermost surface toward a center of the respective Li—Ni composite oxide particles, and wherein the Li—Ni composite oxide particles have a content of lithium hydroxide of not more than 0.25% by weight, and a content of lithium carbonate of not more than 0.20% by weight, the process comprising:
a water-washing step of adjusting a pH value of a slurry prepared by dispersing Li—Ni composite oxide particles in water to 5.0 to 11.0 while stirring; and
a heat-treating step of annealing the Li—Ni composite oxide particles obtained by successively subjecting the particles obtained after the water-washing step to filtration, rinsing and drying, in a temperature range of 450 to 850° C. in an oxygen-containing atmosphere having a carbon dioxide gas concentration of not more than 100 ppm such that after the heat treating step the concentration of the amphoteric metal on the outermost surface of the respective Li—Ni composite oxide particles is higher than the concentration of the amphoteric metal at the position spaced by 50 nm from the outermost surface toward the center of the respective Li—Ni composite oxide particles.

2. The process for producing Li—Ni composite oxide particles according to claim 1, wherein the concentration of the amphoteric metal on the outermost surface of the respective Li—Ni composite oxide particles is 5 to 60 atom % based on a total concentration of Ni, Co, Mn, the amphoteric metal (Ma), Mb and oxygen.

3. The process for producing Li—Ni composite oxide particles according to claim 1, wherein the Li—Ni composite oxide particles have an average secondary particle diameter of 1 to 30 μm.

4. The process for producing Li—Ni composite oxide particles according to claim 1, wherein the Li—Ni composite oxide particles have a sulfur content of not more than 100 ppm, and a sodium content of not more than 100 ppm.

5. A process for producing Li—Ni composite oxide particles having a composition represented by the formula:

$$Li_x(Ni_{1-y-w-z-v}Co_yMn_wMa_zMb_v)O_2$$

wherein $0.9 \leq x \leq 1.1$; $0.05 \leq y \leq 0.25$; $0 \leq w \leq 0.25$; $0 < z \leq 0.15$; $0 \leq v \leq 0.03$; Ma is at least one amphoteric metal selected from the group consisting of Al, Zn and Sn; and Mb is at least one metal selected from the group consisting of Bi, Sb, Zr, B and Mg, wherein the Li—Ni composite oxide particles have a BET specific surface area of 0.05 to 0.8 m²/g; an atomic ratio (Ma/Ni) of a concentration of the amphoteric metal to a concentration of Ni on an outermost surface of the respective Li—Ni composite oxide particles is 2 to 6; and the concentration of the amphoteric metal on the outermost surface of the respective Li—Ni composite oxide particles is higher than a concentration of the amphoteric metal at a position spaced by 50 nm from the outermost surface toward a center of the respective Li—Ni composite oxide particles, and wherein there is a concentration gradient region such that the concentration of the amphoteric metal is gradually decreased into an inner side of particles from the outermost surface having a maximum concentration of the amphoteric metal, the process comprising:

a water-washing step of adjusting a pH value of a slurry prepared by dispersing Li—Ni composite oxide particles in water to 5.0 to 11.0 while stirring; and a heat-treating step of annealing the Li—Ni composite oxide particles obtained by successively subjecting the particles obtained after the water-washing step to filtration, rinsing and drying, in a temperature range of 450 to 850° C. in an oxygen-containing atmosphere having a carbon dioxide gas concentration of not more than 100 ppm such that after the heat treating step the concentration of the amphoteric metal on the outermost surface of the respective Li—Ni composite oxide particles is higher than the concentration of the amphoteric metal at the position spaced by 50 nm from the outermost surface toward the center of the respective Li—Ni composite oxide particles.

6. The process for producing Li—Ni composite oxide particles according to claim 5, wherein the concentration of the amphoteric metal on the outermost surface of the respective Li—Ni composite oxide particles is 5 to 60 atom % based on a total concentration of Ni, Co, Mn, the amphoteric metal (Ma), Mb and oxygen.

7. The process for producing Li—Ni composite oxide particles according to claim 5, wherein the Li—Ni composite oxide particles have an average secondary particle diameter of 1 to 30 μm.

8. The process for producing Li—Ni composite oxide particles according to claim 5, wherein the Li—Ni composite oxide particles have a sulfur content of not more than 100 ppm, and a sodium content of not more than 100 ppm.

* * * * *